US012670025B2

(12) United States Patent
Huang et al.

(10) Patent No.: US 12,670,025 B2
(45) Date of Patent: Jun. 30, 2026

(54) MEMORY ALLOCATION METHOD AND APPARATUS FOR NEURAL NETWORK

(71) Applicant: Huawei Technologies Co., Ltd., Shenzhen (CN)

(72) Inventors: Lihua Huang, Shenzhen (CN); Hao Ding, Shenzhen (CN); Aoxiang Fan, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 18/763,485

(22) Filed: Jul. 3, 2024

(65) Prior Publication Data

US 2025/0004839 A1 Jan. 2, 2025

Related U.S. Application Data

(63) Continuation of application No. 17/112,374, filed on Dec. 4, 2020, now Pat. No. 12,039,371, which is a (Continued)

(30) Foreign Application Priority Data

Jun. 13, 2018 (CN) .......................... 201810607693.9

(51) Int. Cl.
*G06F 9/50* (2006.01)
*G06N 3/063* (2023.01)

(52) U.S. Cl.
CPC ........... *G06F 9/5016* (2013.01); *G06N 3/063* (2013.01); *G06F 2209/501* (2013.01)

(58) Field of Classification Search
None
See application file for complete search history.

(56) References Cited

U.S. PATENT DOCUMENTS 6,078,745 A 6/2000 De Greef et al.
11,514,306 B1 11/2022 Rotem et al.
(Continued)

FOREIGN PATENT DOCUMENTS

CN 105389211 A 3/2016
CN 106095577 A 11/2016
(Continued)

OTHER PUBLICATIONS

Yu, P., et al, "Salus: Fine-Grained GPU Sharing Among CNN Applications," Feb. 2019, 3 pages.
(Continued)

*Primary Examiner* — Baboucarr Faal
(74) *Attorney, Agent, or Firm* — Conley Rose, P.C.

(57) ABSTRACT

A memory allocation method for a neural network includes determining information about N memory blocks, sorting the N memory blocks in descending order based on sizes of the N memory blocks, allocating a first memory block to the neural network, to perform an operation for a first node set in the neural network, determining whether a memory block in an allocated set is reusable for an nth memory block, where the allocated set includes a memory block that has been allocated to the neural network, if the memory block in the allocated set is reusable for the nth memory block, allocating, to the neural network, the memory block to perform an operation for an nth node set in the neural network, then updating the allocated set, and sequentially performing the foregoing determining from n=2 to n=N based on the sort sequence.

20 Claims, 16 Drawing Sheets

Related U.S. Application Data continuation of application No. PCT/CN2019/082332, filed on Apr. 11, 2019.

(56) References Cited

U.S. PATENT DOCUMENTS

| | | |
|---|---|---|
| 2002/0144073 A1 | 10/2002 | Trainin et al. |
| 2015/0363236 A1 | 12/2015 | Manpathak et al. |
| 2016/0342888 A1 | 11/2016 | Yang et al. |
| 2018/0088996 A1 | 3/2018 | Rossi et al. |
| 2021/0342265 A1 | 11/2021 | Folliot et al. |

FOREIGN PATENT DOCUMENTS

| | | |
|---|---|---|
| CN | 106445680 A | 2/2017 |
| CN | 106648907 A | 5/2017 |
| CN | 106776042 A | 5/2017 |
| CN | 106776356 A | 5/2017 |
| CN | 106980541 A | 7/2017 |
| CN | 107153618 A | 9/2017 |
| CN | 108304265 A | 7/2018 |
| JP | H07334430 A | 12/1995 |

OTHER PUBLICATIONS

Lee, Y., et al, "Towards High-Performance Prediction Serving Systems," 31st Conference on Neural Information Processing Systems, Dec. 2017, 3 pages.
Rhu, M., et al, "vDNN: Virtualized Deep Neural Networks for Scalable, Memory-Efficient Neural Network Design," 49th Annual IEEE/ACM International Symposium Onmicroarchitecture (Micro), IEEE, Oct. 2016, XP033022464, 13 pages.

Allocated set:   a 100 MB memory block, corresponding to a node set (1, 2, 5, 6, 7)

Allocated set: a 100 MB memory block, corresponding to a node set (1, 2, 5, 6, 7); and a 20 MB memory block, corresponding to a node set (3, 4, 5)

Allocated set: a 100 MB memory block, corresponding to a node set (1, 2, 5, 6, 7); and a 20 MB memory block, corresponding to a node set (3, 4, 5, 7, 8)

Allocated set: a 100 MB memory block, corresponding to a node set (1, 2, 5, 6, 7); a
20 MB memory block, corresponding to a node set (3, 4, 5, 7, 8); and a
10 MB memory block, corresponding to a node set (2, 3)

```
        ┌───┐
        │ A │
        └───┘
          │
          ▼
        ┌───┐
        │ B │──────────┐
        └───┘          │
          │            ▼
          ▼          ┌───┐
        ┌───┐        │ F │
        │ C │        └───┘
        └───┘          │
          │            ▼
          ▼          ┌───┐
        ┌───┐        │ G │
        │ E │───────▶│   │
        └───┘        └───┘
```

MEMORY ALLOCATION METHOD AND APPARATUS FOR NEURAL NETWORK

CROSS-REFERENCE TO RELATED APPLICATION

This is a continuation of U.S. patent application Ser. No. 17/112,374, filed on Dec. 4, 2020, now U.S. Pat. No. 12,039,371, which is a continuation of Int'l Patent App. No. PCT/CN2019/082332, filed on Apr. 11, 2019, which claims priority to Chinese Patent App. No. 201810607693.9, filed on Jun. 13, 2018, all of which are incorporated by reference.

TECHNICAL FIELD

This application relates to the field of deep learning technologies, and in particular, to a memory allocation method and apparatus for a neural network.

BACKGROUND

In the current computer deep learning field, a deep learning neural network grows increasingly complex to achieve higher algorithm precision. However, a hardware capability hinders in-depth development of the neural network, and memory needs to be optimized. To optimize the memory, the following memory allocation policies are usually used in the industry.

An entire neural network is run, and then memory is allocated to the entire neural network based on a sequence of running of the entire neural network. For example, memory blocks of 100 megabytes (MB), 10 MB, and 50 MB need to be sequentially occupied during running of the neural network. In this case, in other approaches, when the neural network requests a 100 MB memory block, the 100 MB memory block may be allocated to the neural network. Then, when the neural network requests the 10 MB memory block, it may be determined whether the allocated 100 MB memory block can be reused for the requested 10 MB memory block. If the allocated 100 MB memory block can be reused for the requested 10 MB memory block, a new memory block is not allocated for the requested 10 MB memory block, and the 100 MB memory block is reused for the requested 10 MB memory block. Similarly, when the neural network requests the 50 MB memory block, it is also determined whether the allocated 100 MB memory block can be reused for the requested 50 MB memory block. If the allocated 100 MB memory block can be reused for the requested 50 MB memory block, it is scheduled that the allocated 100 MB memory block is reused for the 50 MB memory block. If the allocated 100 MB memory block cannot be reused for the requested 50 MB memory block, a new 50 MB memory block is allocated as requested.

It can be learned from the foregoing description that, in other approaches, when the neural network requests a memory block, it needs to be first determined whether an allocated memory block can be reused for the requested memory block. If the allocated memory block can be reused for the requested memory block, it is directly scheduled that the allocated memory block is reused for the requested memory block. If the allocated memory block cannot be reused for the requested memory block, a new memory block is then allocated for the requested memory block. However, if the allocated 100 MB memory block can be reused for both the requested 10 MB memory block and the requested 50 MB memory block, the allocated 100 MB memory block may be reused for the requested 10 MB memory block, but a new 50 MB memory block is allocated to the neural network. In this case, the entire neural network needs to occupy memory blocks of 150 MB in total. Consequently, the entire neural network occupies a large amount of memory, and the memory is improperly allocated.

SUMMARY

Embodiments of this application provide a memory allocation method and apparatus for a neural network, to optimize memory of the neural network.

According to a first aspect, a memory allocation method for a neural network is provided, where N memory blocks need to be occupied during running of the neural network, N is an integer greater than or equal to 1, and the method includes determining information about the N memory blocks, where the information about the N memory blocks includes sizes of the N memory blocks and a node set that is in a one-to-one correspondence with each of the N memory blocks, and the memory block is used to perform an operation for the node set that is in the neural network and in a one-to-one correspondence with each memory block, sorting the N memory blocks in descending order based on the sizes of the N memory blocks, to obtain a sort sequence of the N memory blocks, allocating a first memory block to the neural network, to perform an operation for a first node set in the neural network, where the first memory block is a largest memory block in the N memory blocks, determining whether a memory block in an allocated set can be reused for an $n^{th}$ memory block, where the allocated set includes a memory block that has been allocated to the neural network, and if the memory block in the allocated set can be reused for the $n^{th}$ memory block, allocating, to the neural network, the memory block that can be reused, to perform an operation for an $n^{th}$ node set in the neural network, and then updating the allocated set, where n is a positive integer greater than or equal to 2 and less than or equal to N, and sequentially performing the foregoing determining from n=2 to n=N based on the sort sequence, and updating the allocated set if it is determined that the memory block in the allocated set can be reused for the $n^{th}$ memory block.

It can be learned from the foregoing that, in this embodiment of this application, memory block allocation and reuse are performed based on a size of the memory block. Compared with other approaches in which memory block allocation and reuse are performed based on a sequence in which a memory block is requested, this method may obtain a global optimal reuse solution for all memory blocks. Therefore, in a memory block reuse process, reuse may be performed between memory blocks in similar sizes. This prevents a relatively large memory block that has been allocated from being reused for a relatively small memory block, and prevents a relatively large memory block from being reallocated. Therefore, memory allocation for the neural network is optimized.

In a possible implementation, the method further includes, if the memory block in the allocated set cannot be reused for the $n^{th}$ memory block, allocating the $n^{th}$ memory block to the neural network, to perform the operation for the $n^{th}$ node set in the neural network.

In a possible implementation, the determining whether a memory block in an allocated set can be reused for an $n^{th}$ memory block includes determining whether there is an intersection between the $n^{th}$ node set and an $x^{th}$ node set, and if there is no intersection, determining that an $x^{th}$ memory block corresponding to the $x^{th}$ node set can be reused for the $n^{th}$ memory block, where the allocated set includes the $x^{th}$ memory block, the $x^{th}$ memory block is used to perform an operation for the $x^{th}$ node set in the neural network, and x is a positive integer less than n.

In a possible implementation, the updating the allocated set includes updating, based on the $n^{th}$ node set, a node set corresponding to the memory block that can be reused.

In a possible implementation, the determining information about N memory blocks includes running the neural network, recording information about a memory block occupied by an input parameter of each node in the neural network, information about a memory block occupied by an output parameter of each node, and information about a memory block occupied by an intermediate parameter of each node, and determining the information about the N memory blocks based on the information about the memory block occupied by the input parameter of each node in the neural network, the information about the memory block occupied by the output parameter of each node, and the information about the memory block occupied by the intermediate parameter of each node.

It can be learned from the foregoing that, in this embodiment of this application, information about all memory blocks that need to be used by the entire neural network may be obtained. The information about all memory blocks that need to be used includes not only information about memory blocks that need to be occupied by an input parameter and an output parameter of a node, but also information about a memory block that needs to be occupied by an intermediate parameter. This avoids a problem in other approaches that neither statistics collection nor optimization can be performed on the memory block that needs to be occupied by the intermediate parameter. Therefore, all memory blocks that need to be used by the entire neural network are optimized. In addition, in this embodiment of this application, the entire neural network is run in advance, and the information about all memory blocks that need to be used is recorded and optimized. Therefore, a global optimal solution for all memory blocks that need to be used by the entire neural network can be obtained, to reduce memory space occupied by the neural network.

According to a second aspect, this application provides a memory allocation apparatus for a neural network, where the memory allocation apparatus for the neural network is applied to a terminal device or a server and includes a unit or a means (means) used to perform steps in the first aspect.

According to a third aspect, this application provides a memory optimization apparatus for a neural network, where the memory optimization apparatus for the neural network is applied to a terminal device or a server and includes at least one processing element and at least one storage element. The at least one storage element is configured to store a program and data. The at least one processing element is configured to perform the method provided in the first aspect or any possible implementation of the first aspect of this application.

According to a fourth aspect, this application provides a computer-readable storage medium. The computer-readable storage medium stores a computer instruction, and when the computer instruction is run on a processor, the processor is enabled to perform the method provided in the first aspect or any possible implementation of the first aspect.

According to a fifth aspect, this application provides a computer program product. The computer program product includes a computer instruction, and when the computer instruction is run on a processor, the processor is enabled to perform the method provided in the first aspect or any possible implementation of the first aspect.

DESCRIPTION OF EMBODIMENTS

The following describes the embodiments of this application with reference to the accompanying drawings.

Currently, in the field of deep learning, the following two policies are usually used in the industry to optimize memory allocation for a neural network.

A first policy is an in-place policy. This policy means that input parameter and output parameter of each node in the neural network shares one memory block.

A second policy is a co-share policy. This policy means that a memory block can be used for a plurality of nodes in the neural network. When all these nodes complete execution, a life cycle of the memory block ends. Then, the memory block can be used by another node in the neural network. For example, a life cycle of a memory block A may be preset to (1, 2, 3), indicating that the memory block A can be used by a node 1, a node 2, and a node 3. When all the node 1, the node 2, and the node 3 complete execution, the life cycle of the memory block A ends. Then, the memory block A may be included in an idle linked list for use by another node in the neural network. In the embodiments of this application, a node in the neural network may also be referred to as an operator, a layer, or the like. In the embodiments of this application, the node is used as an example for description.

Currently, a specific method for performing memory allocation according to the second policy is performing memory block allocation and reuse based on an execution sequence of nodes in the neural network. In this case, a memory allocation effect is relatively poor.

Figure 1:
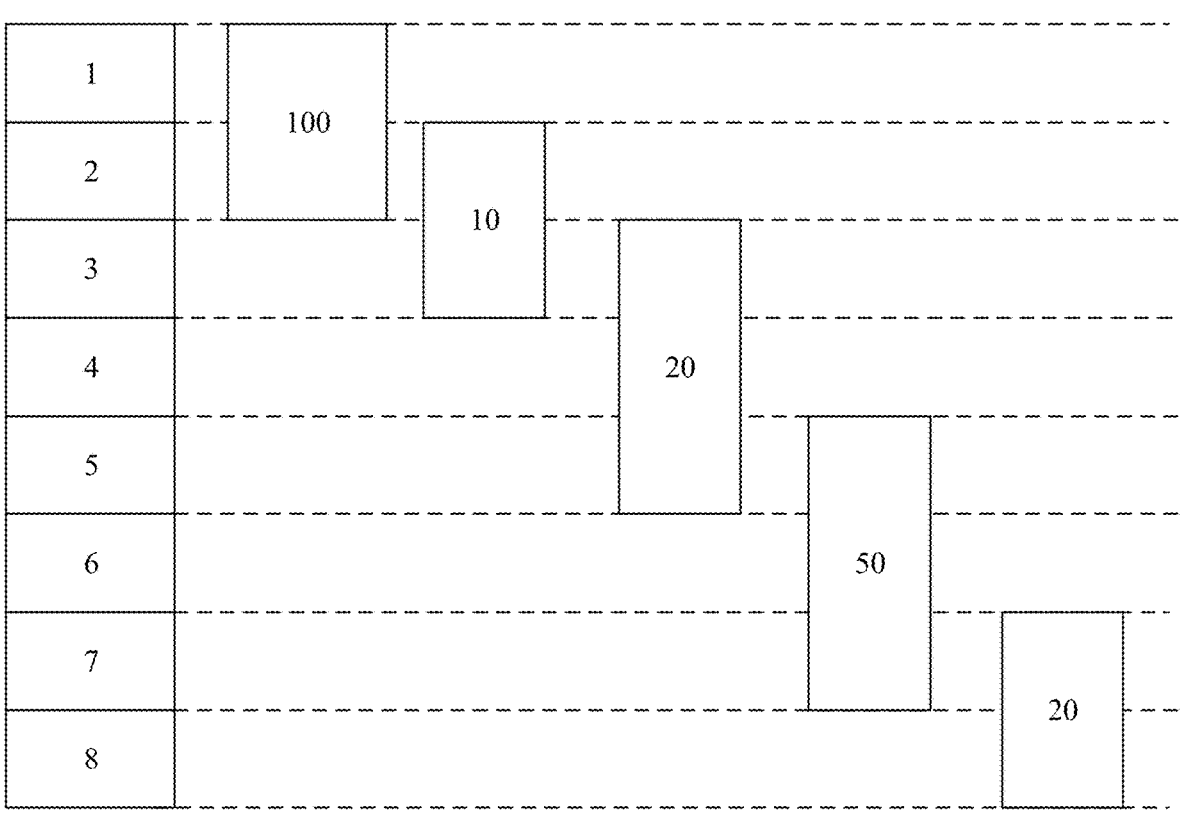
FIG. 1 is a schematic diagram of memory block information according to an embodiment of this application.

For example, as shown in FIG. 1, an entire neural network includes eight nodes, and the eight nodes are indexed from 1 to 8 according to a running sequence. Through pre-analysis, it can be obtained that five memory blocks need to be chronologically occupied during running of the neural network shown in FIG. 1. Each memory block is used to perform an operation for a node set corresponding to the memory block. The five memory blocks are a first memory block, a second memory block, a third memory block, a fourth memory block, and a fifth memory block. In addition, a size of the first memory block that needs to be occupied by the neural network is 100 MB, and a node set corresponding to the first memory block is (1, 2). A size of the second memory block that needs to be occupied by the neural network is 10 MB, and a node set corresponding to the second memory block is (2, 3). A size of the third memory block that needs to be occupied by the neural network is 20 MB, and a node set corresponding to the third memory block is (3, 4, 5). A size of the fourth memory block that needs to be occupied by the neural network is 50 MB, and a node set corresponding to the fourth memory block is (5, 6, 7). A size of the fifth memory block that needs to be occupied by the neural network is 20 MB, and a node set corresponding to the fifth memory block is (7, 8).

In this embodiment of this application, information about the first memory block that needs to be occupied by the neural network may be first obtained. Then, a 100 MB memory block is allocated to the neural network based on information about the size of the first memory block, and a node set corresponding to the 100 MB memory block is set to (1, 2). Finally, the allocated 100 MB memory block is classified into an allocated set. Then, information about the second memory block that needs to be occupied by the neural network is obtained, and it is determined whether there is an intersection between the node set (2, 3) corresponding to the second memory block and the node set (1, 2) corresponding to the 100 MB memory block in the allocated set. If there is an intersection, the 100 MB memory block in the allocated set cannot be reused for the second memory block. Therefore, a 10 MB memory block is allocated to the node set (2, 3) in the neural network, and a node set corresponding to the 10 MB memory block is set to (2, 3). Finally, the allocated 10 MB memory block is classified into the allocated set. Next, information about the third memory block that needs to be occupied by the neural network is obtained, and it is determined whether there is an intersection between the node set (3, 4, 5) corresponding to the third memory block and the node set (1, 2) corresponding to the 100 MB memory block in the allocated set. It can be learned that there is no intersection. Therefore, it is scheduled that the allocated 100 MB memory block is reused for the third memory block that needs to be occupied by the neural network, and the node set corresponding to the 100 MB memory block is updated to (1, 2, 3, 4, 5). Likewise, the node set (5, 6, 7) corresponding to the fourth memory block that needs to be occupied by the neural network is obtained, and it is determined that there is an intersection between the node set (5, 6, 7) corresponding to the fourth memory block and the node set (1, 2, 3, 4, 5) corresponding to the allocated 100 MB memory block. Therefore, the allocated 100 MB memory block cannot be reused for the fourth memory block that needs to be occupied by the neural network. Meanwhile, it may be determined that there is no intersection between the node set (5, 6, 7) corresponding to the fourth memory block that needs to be occupied by the neural network and the node set (2, 3) corresponding to the allocated 10 MB memory block. Therefore, it may be scheduled that the allocated 10 MB memory block is reused for the fourth memory block that needs to be occupied by the neural network. Then, a 40 MB memory block is additionally requested and a life cycle of the 10 MB memory block is updated to (2, 3, 5, 6, 7). In addition, the additionally requested 40 MB memory block may be classified into the allocated set. Finally, the node set (7, 8) corresponding to the fifth memory block that needs to be occupied by the neural network is obtained. It may be learned that there is no intersection between the node set (7, 8) corresponding to the fifth memory block and the node set corresponding to the allocated 100 MB memory block. Therefore, it may be scheduled that the allocated 100 MB memory block is reused for the fifth memory block, and the node set corresponding to the allocated 100 MB memory block may be updated to (1, 2, 3, 4, 5, 7, 8). It can be learned that, by using the foregoing memory allocation method, memory of 100 MB+10 MB+40 MB=150 MB needs to be allocated to the neural network shown in FIG. 1. A memory allocation effect is relatively poor, and the neural network still needs to occupy a relatively large amount of memory.

In view of this, this application provides a memory allocation method for a neural network. A main principle of the method is sorting, based on sizes of memory blocks, the memory blocks that need to be occupied by the neural network, and then allocating the memory blocks based on a sort sequence. According to the foregoing method, it can be ensured that an allocated memory block is reused for a relatively large memory block that needs to be occupied by the neural network, and that a new memory block is allocated for a relatively small memory block that needs to be occupied by the neural network. This may reduce memory occupation of the entire neural network and better optimize memory.

The following explains some terms in this application to facilitate understanding by a person skilled in the art.

(1) A node set corresponding to each memory block is a set of nodes that can use the memory block to perform an operation in a neural network. For example, in FIG. 1, the node set (1, 2) corresponding to the first memory block indicates that the node 1 and the node 2 can use the first memory block to perform an operation in the neural network shown in FIG. 1. The node set corresponding to each memory block may also be referred to as a life cycle of each memory block. For example, the node set (1, 2) corresponding to the first memory block shown in FIG. 1 may also be referred to as a life cycle (1, 2) of the first memory block.

(2) An allocated set is an information set of allocated memory blocks in the neural network. The allocated set may also be referred to as a shared memory queue or the like, and this is not limited in this application.

(3) A node is a unit used for an operation in the neural network, and the node may also be referred to as an operator, a layer, or the like. This is not limited in this application.

Figure 2:
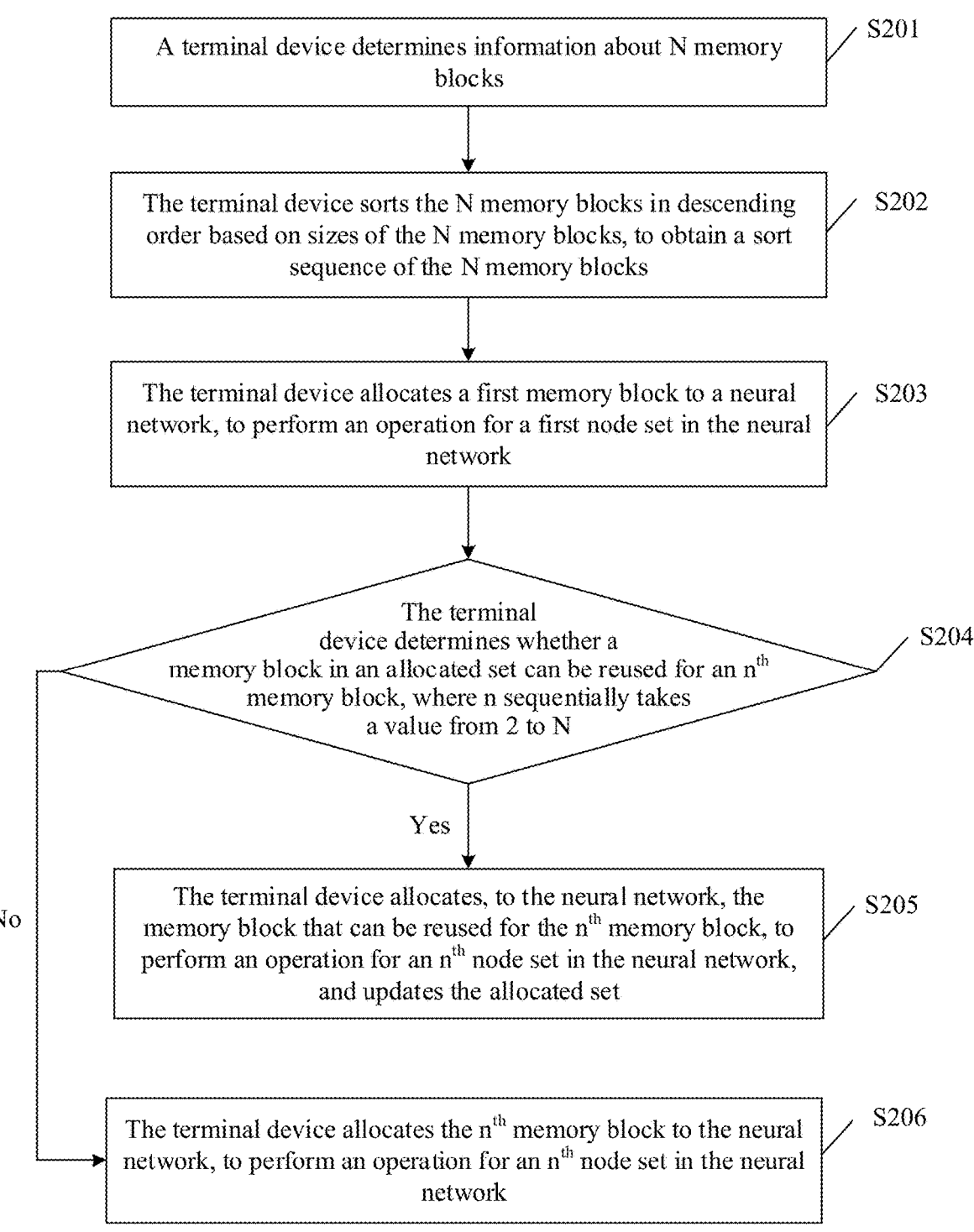
FIG. 2 is a flowchart of a memory allocation method for a neural network according to an embodiment of this application.

FIG. 2 is a flowchart of a memory allocation method for a neural network according to an embodiment of this application. The method may be performed by a server on which a neural network is run, or may be performed by a terminal device on which a neural network is run. In this embodiment of this application, an example in which the method is performed by the terminal device on which the neural network is run is used for description. In a process shown in FIG. 2, it may be specified that N memory blocks need to be occupied during running of the entire neural network. As shown in FIG. 2, the process includes the following steps.

Step S201. A terminal device determines information about the N memory blocks.

In this embodiment of this application, the information about the N memory blocks includes sizes of the N memory blocks and a node set that is in a one-to-one correspondence with each of the N memory blocks, and the memory block is used to perform an operation for the node set that is in the neural network and in a one-to-one correspondence with each memory block.

In this embodiment of this application, for step S201, the terminal device may determine the information about the N memory blocks in the following manners.

Example 1. The terminal device runs the neural network, records information about a memory block occupied by an input parameter of each node in the neural network, information about a memory block occupied by an output parameter of each node, and information about a memory block occupied by an intermediate parameter of each node, and determines the information about the N memory blocks based on the information about the memory block occupied by the input parameter of each node in the neural network, the information about the memory block occupied by the output parameter of each node, and the information about the memory block occupied by the intermediate parameter of each node.

In the example 1, the terminal device may record the information about the memory block occupied by the input parameter, the information about the memory block occupied by the output parameter, and the information about the memory block occupied by the intermediate parameter, and generate the information about the N memory blocks in step S201 based on the information about the memory block occupied by the input parameter, the information about the memory block occupied by the output parameter, and the information about the memory block occupied by the intermediate parameter. Then, the method provided in FIG. 2 of this application is used to optimize an allocation policy for the memory block occupied by the input parameter of each node in the neural network, the memory block occupied by the output parameter of each node, and the memory block occupied by the intermediate parameter of each node.

For example, in the example 1, the entire neural network includes a node 1 and a node 2. In addition, by running the neural network, it may be recorded that during running of the neural network, a memory block A, a memory block B, and a memory block C are used by an input parameter, an intermediate parameter, and an output parameter of the node 1 respectively, and the memory block B, the memory block C, and a memory block D are used by an input parameter, an intermediate parameter, and an output parameter of the node 2 respectively. Based on the foregoing records, it may be obtained that a node set corresponding to the memory block A is (1), a node set corresponding to the memory block B is (1, 2), a node set corresponding to the memory block C is (1, 2), and a node set corresponding to the memory block D is (2). The entire neural network may include information about four memory blocks information about a first memory block, information about a second memory block, information about a third memory block, and information about a fourth memory block. The information about the first memory block includes a size of the memory block A and the node set (1) corresponding to the memory block A. The information about the second memory block includes a size of the memory block B and the node set (1, 2) corresponding to the memory block B. The information about the third memory block includes a size of the memory block C and the node set (1, 2) corresponding to the memory block C.

The information about the fourth memory block includes a size of the memory block D and the node set (2) corresponding to the memory block D.

For the example 1, by using a memory allocation method provided in other approaches, a neural network is converted into a DAG, and the DAG graph is traversed to learn of usage of a memory block in the neural network. By using the DAG graph, only statistics on a memory block used by an input parameter in the neural network and a memory block used by an output parameter in the neural network can be collected, but statistics on a memory block used by an intermediate parameter in the neural network cannot be collected. Correspondingly, by using the memory allocation policy in other approaches, allocation of memory occupied only by the input parameter and the output parameter of the neural network can be optimized, but allocation of memory occupied by the intermediate parameter of the neural network cannot be optimized. However, by using the method in the example 1, allocation of memory occupied by the input parameter, the output parameter, and the intermediate parameter of the neural network can all be optimized. Therefore, the allocation policy is better optimized.

Example 2. The terminal device runs the neural network, records information about a memory block occupied by an input parameter of each node in the neural network, information about a memory block occupied by an output parameter of each node, and information about a memory block occupied by an intermediate parameter of each node, and determines the information about the N memory blocks based on the information about the memory block occupied by the input parameter of each node, the information about the memory block occupied by the output parameter of each node, and the information about the memory block occupied by the intermediate parameter of each node.

In the example 2, the terminal device may record only the information about the memory block occupied by the input parameter of the node, generate the information about the N memory blocks in step S201, and optimize, by using the method provided in FIG. 2 of this application, only memory occupied by the input parameter. Alternatively, the terminal device may record only the information about the memory block occupied by the output parameter of each node, generate the information about the N memory blocks in step S201, and optimize, by using the method provided in FIG. 2 of this application, only memory occupied by the output parameter. Alternatively, only memory occupied by the intermediate parameter of each node is optimized.

Example 3. The terminal device runs the neural network, records information about memory blocks occupied by any two of the input parameters, an output parameter, and an intermediate parameter of each node in the neural network, and determines the information about the N memory blocks based on the information about the memory blocks occupied by the any two parameters of each node.

In the example 3, the terminal device may record only any two parameters of the input parameter, the intermediate parameter, and the output parameter of the node, and then performs optimization for the any two parameters. For the entire neural network, an optimization effect of the example 3 is poorer than that of the example 1 and that of the example 2.

Step S202. The terminal device sorts the N memory blocks in descending order based on the sizes of the N memory blocks, to obtain a sort sequence of the N memory blocks.

In this embodiment of this application, after the N memory blocks are sorted based on the sizes of the memory blocks, the obtained sort sequence of the N memory blocks may be in an order of the first memory block, the second memory block, and so on till an $N^{th}$ memory block. The first memory block is a largest memory block in the N memory blocks, and the $N^{th}$ memory block is a smallest memory block in the N memory blocks.

In this embodiment of this application, each of the N memory blocks corresponds to one node set. For ease of description, a node set corresponding to the first memory block may be referred to as a first node set, a node set corresponding to the second memory block may be referred to as a second node set, and a node set corresponding to an $n^{th}$ memory block may be referred to as an $n^{th}$ node set. By analogy, a node set corresponding to the $N^{th}$ memory block is referred to as an $N^{th}$ node set.

Step S203. The terminal device allocates the first memory block to the neural network, to perform an operation for the first node set in the neural network.

In this embodiment of this application, the terminal device may classify the first memory block into an allocated set, where the allocated set includes a memory block that has been allocated to the neural network.

Step S204. For any memory block, namely, the $n^{th}$ memory, in the second memory block to the $N^{th}$ memory block, where n is a positive integer greater than or equal to 2 and less than or equal to N, the terminal device determines whether the memory block in the allocated set can be reused for the $n^{th}$ memory block, and performs step S205 if the memory block in the allocated set can be reused for the $n^{th}$ memory block, or performs step S206 if the memory block in the allocated set cannot be reused for the $n^{th}$ memory block.

In this embodiment of this application, step S204 may be performed for the second memory block to the $N^{th}$ memory block based on the sort sequence in descending order. n may sequentially take a value from 2 to N.

In this embodiment of this application, it is specified that the allocated set includes an $x^{th}$ memory block, and the $x^{th}$ memory block is used to perform an operation for an $x^{th}$ node set in the neural network. In other words, a node set corresponding to the $x^{th}$ memory block is the $x^{th}$ node set. In this embodiment of this application, it may be determined whether there is an intersection between the $n^{th}$ node set and the $x^{th}$ node set. If there is no intersection between the $n^{th}$ node set and the $x^{th}$ node set, it is determined that the allocated $x^{th}$ memory block can be reused for the $n^{th}$ memory block. If there is an intersection between the $n^{th}$ node set and the $x^{th}$ node set, it is determined that the allocated $x^{th}$ memory block cannot be reused for the $n^{th}$ memory block. x may be a positive integer less than n.

Step S205. The terminal device allocates, to the neural network, the memory block that can be reused for the $n^{th}$ memory block, to perform an operation for the $n^{th}$ node set in the neural network, and updates the allocated set.

In this embodiment of this application, a node set corresponding to the memory block that can be reused is updated based on the $n^{th}$ node set. In an example of this application, for example, the $n^{th}$ node set corresponding to the $n^{th}$ memory block is (1, 2), and the $x^{th}$ node set corresponding to the allocated $x^{th}$ memory block is (3, 4). It can be learned that there is no intersection between the $n^{th}$ node set and the $x^{th}$ node set, and it may be determined that the $x^{th}$ memory block can be reused for the $n^{th}$ memory block. In this case, the node set corresponding to the $x^{th}$ memory block may be updated to (1, 2, 3, 4).

Step S206. The terminal device allocates the $n^{th}$ memory block to the neural network, to perform an operation for the $n^{th}$ node set in the neural network.

In addition, the allocated set is updated. In an embodiment, the $n^{th}$ memory block is classified into the allocated set.

It can be learned from the foregoing that, in this embodiment of this application, information about memory blocks used by the entire neural network is first obtained, then memory blocks that need to be used by the neural network are sorted in descending order, and subsequently the memory blocks are allocated based on a sort sequence of the memory blocks. Compared with other approaches in which memory blocks are allocated based on a sequence of occupying the memory blocks by a neural network, this method ensures that an allocated memory block is allocated for being reused for a relatively large memory block and a new memory block is allocated for a small memory block. Therefore, memory occupation of the entire neural network is reduced and a memory allocation policy is optimized.

In this embodiment of this application, as shown in FIG. 1, the method provided in FIG. 2 is described in detail by using an example in which an entire neural network includes eight nodes indexed from 1 to 8.

The terminal device may run the neural network provided in FIG. 1 in advance, and record information about a memory block occupied by an input parameter, information about a memory block occupied by an output parameter, and information about a memory block occupied by an intermediate parameter of each of the eight nodes. Finally, the terminal device may determine, through statistical analysis, that a total of five memory blocks need to be sequentially occupied during running of the neural network shown in FIG. 1. The five memory blocks are a 100 MB memory block, a 10 MB memory block, a 20 MB memory block, a 50 MB memory block, and another 20 MB memory block. In addition, it may be determined that a node set corresponding to the 100 MB memory block is (1, 2), a node set corresponding to the 10 MB memory block is (2, 3), a node set corresponding to the 20 MB memory block is (3, 4, 5), a node set corresponding to the 50 MB memory block is (5, 6, 7), and a node set corresponding to the another 20 MB memory block is (7, 8). This process may correspond to step S201 that is shown in FIG. 2 and in which the information about N memory blocks is determined. In this example, a value of N is 5.

Figure 3:
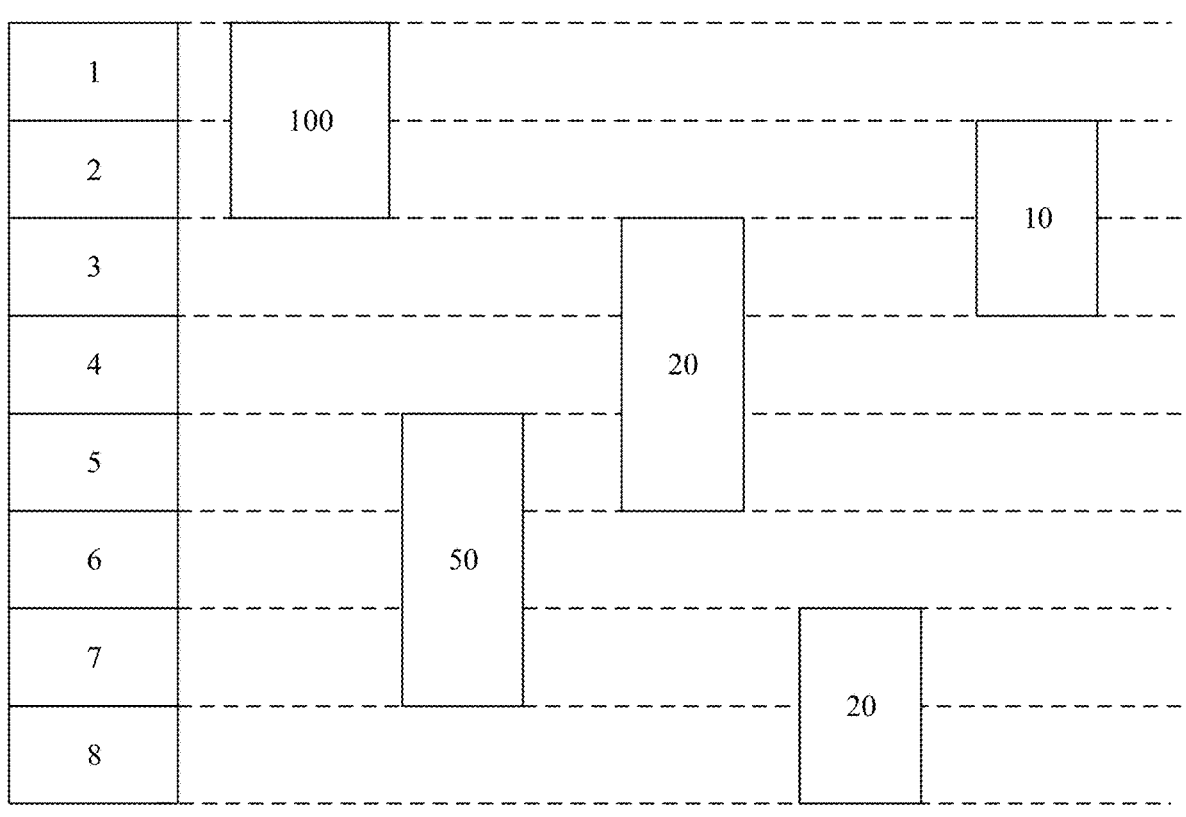
FIG. 3 is a schematic diagram of sorting memory blocks according to an embodiment of this application.

Then, the terminal device may sort the five memory blocks in descending order, to obtain a sort sequence of the five memory blocks. As shown in FIG. 3, the sort sequence of the five memory blocks may be in an order of the 100 MB memory block, the 50 MB memory block, the 20 MB memory block, the other 20 MB memory block, and the 10 MB memory block. This process may correspond to step S202 in FIG. 2.

The terminal device may allocate a largest memory block, that is, the 100 MB memory block, in the foregoing five memory blocks to the neural network shown in FIG. 1, to perform operations for a node 1 and a node 2. In addition, the terminal device may store information about the 100 MB memory block to an allocated set. This process may correspond to step S203 shown in FIG. 2.

The terminal device may sequentially determine whether the memory block in the allocated set can be reused for the 50 MB memory block, the 20 MB memory block, the other 20 MB memory block, and the 10 MB memory block shown in FIG. 3. If the memory block in the allocated set can be reused, the memory block that can be reused is allocated to perform an operation for a corresponding node in the neural network. For example, it is determined that an allocated memory block can be reused for the 50 MB memory block. In this case, the allocated memory block may be reused, to perform an operation for the node set (5, 6, 7) corresponding to the 50 MB memory block. If the allocated memory block cannot be reused, a corresponding new memory block is allocated to perform an operation for a corresponding node set. This process may correspond to steps S204 to S206 in FIG. 2.

Figure 4:
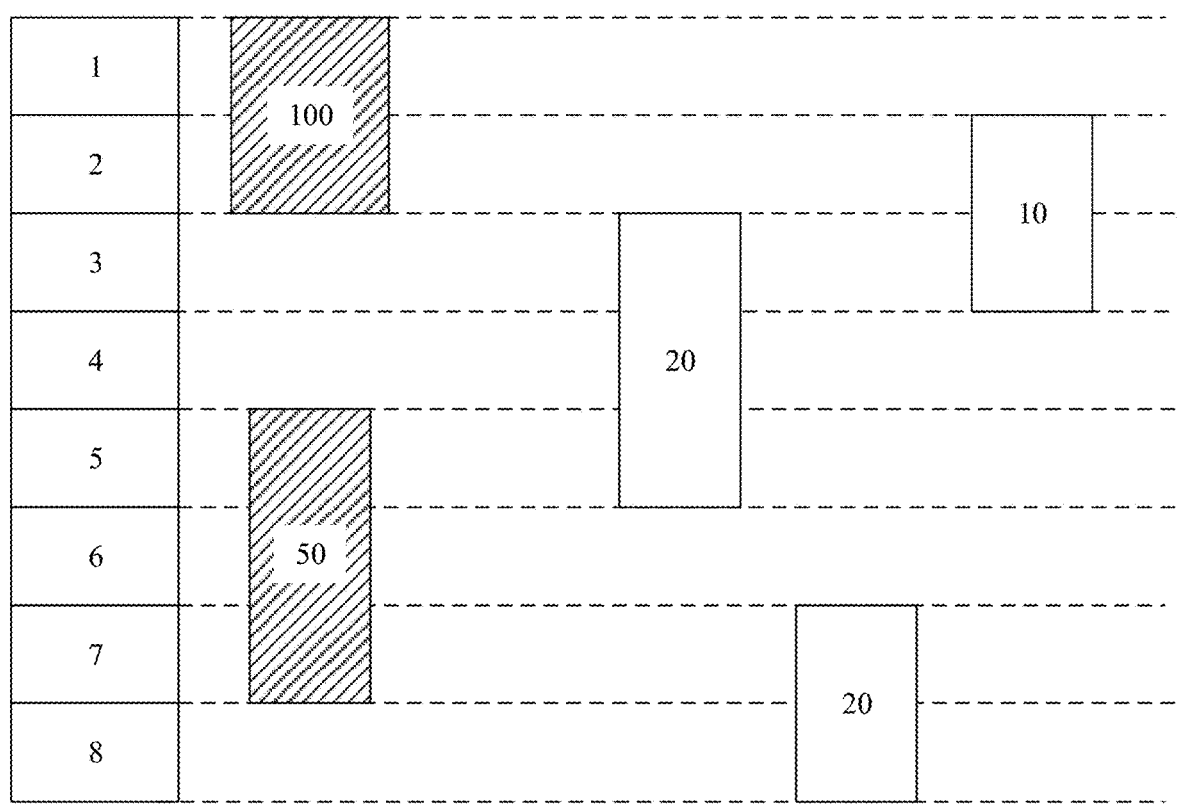
FIG. 4, FIG. 5, and FIG. 6 are schematic diagrams of memory block reuse according to an embodiment of this application.

As shown in FIG. 4, for the 50 MB memory block, it may be first determined whether there is an intersection between the node set (5, 6, 7) corresponding to the 50 MB memory block and the node set (1, 2) of the allocated 100 MB memory block. It may be learned that there is no intersection between the node set (5, 6, 7) corresponding to the 50 MB memory block and the node set (1, 2) of the allocated 100 MB memory block. In this case, it may be scheduled that the 100 MB memory block is reused for the 50 MB memory block. In other words, it is scheduled that the 100 MB memory block is used for an operation for the node set (5, 6, 7), and no 50 MB memory block is reallocated for the operation for the node set (5, 6, 7). In this case, the node set corresponding to the 100 MB memory block in an allocated set may be updated to (1, 2, 5, 6, 7), as shown in FIG. 4. In FIG. 4, black slashes are used to represent that the 50 MB memory block and the 100 MB memory block are actually one memory block.

Figure 5:
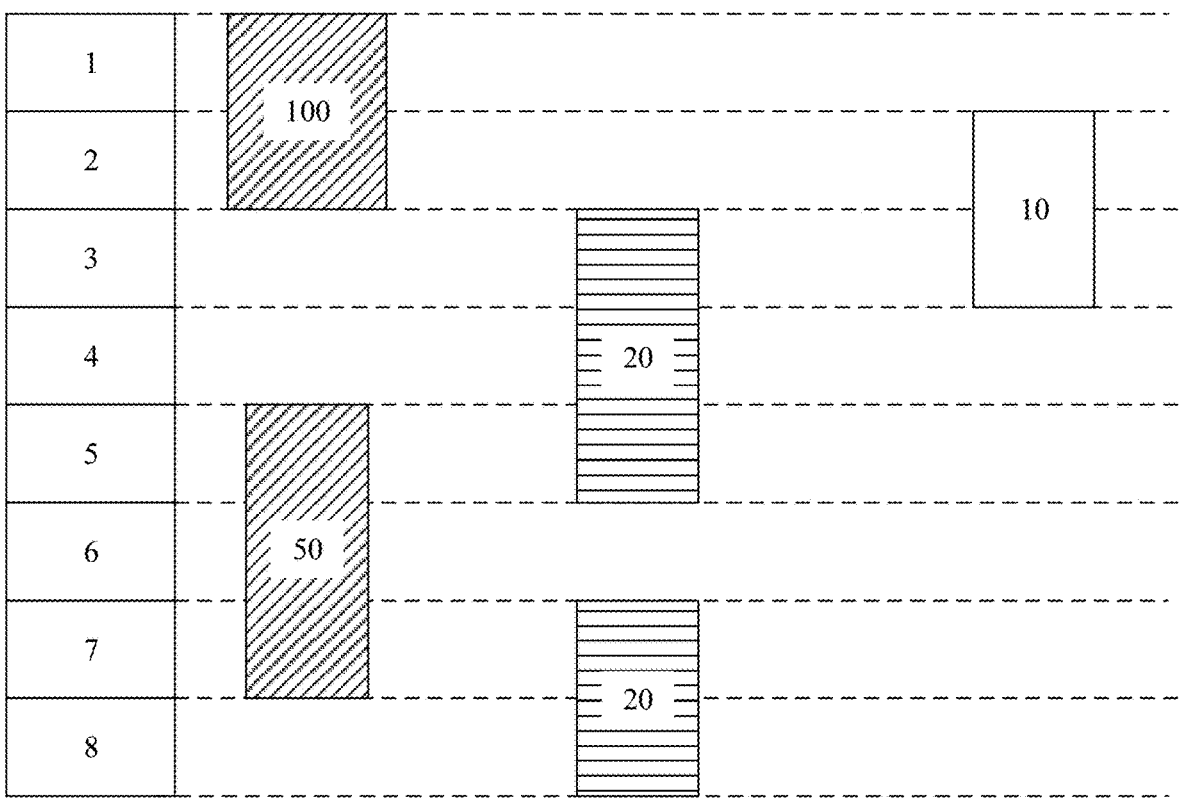
Figure 5:
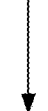

In this embodiment of this application, as shown in FIG. 5, it may be sequentially determined whether there is an intersection between the node set (3, 4, 5) corresponding to the 20 MB memory block and the node set (1, 2, 5, 6, 7) corresponding to the allocated 100 MB memory block in the allocated set. It may be learned that there is an intersection between the node set (3, 4, 5) corresponding to the 20 MB memory block and the node set (1, 2, 5, 6, 7) corresponding to the allocated 100 MB memory block in the allocated set. In this case, the 20 MB memory block may be allocated for an operation for the node set (3, 4, 5) in the neural network, and information about the allocated 20 MB memory block may be included in the allocated set.

Similarly, for the next 20 MB memory block in FIG. 5, it may be first determined whether there is an intersection between the node set (7, 8) of the 20 MB memory block and the node set (1, 2, 5, 6, 7) of the 100 MB memory block in the allocated set. It may be learned that there is an intersection between the node set (7, 8) of the 20 MB memory block and the node set (1, 2, 5, 6, 7) of the 100 MB memory block in the allocated set. Then, it is determined whether there is an intersection between the node set (7, 8) of the 20 MB memory block and the node set (3, 4, 5) corresponding to the 20 MB memory block in the allocated set. It may be learned that there is no intersection between the node set (7, 8) of the 20 MB memory block and the node set (3, 4, 5) corresponding to the 20 MB memory block in the allocated set. In this case, it may be scheduled that the 20 MB memory block in the allocated set is reused for operations for a node 7 and a node 8 in the neural network. A new memory block is no longer allocated for the node 7 and the node 8 in the neural network. In addition, the node set corresponding to the 20 MB memory block in the allocated set is updated to (3, 4, 5, 7, 8). In FIG. 5, black horizontal lines are used to represent that two 20 MB memory blocks are actually one memory block.

Figure 6:
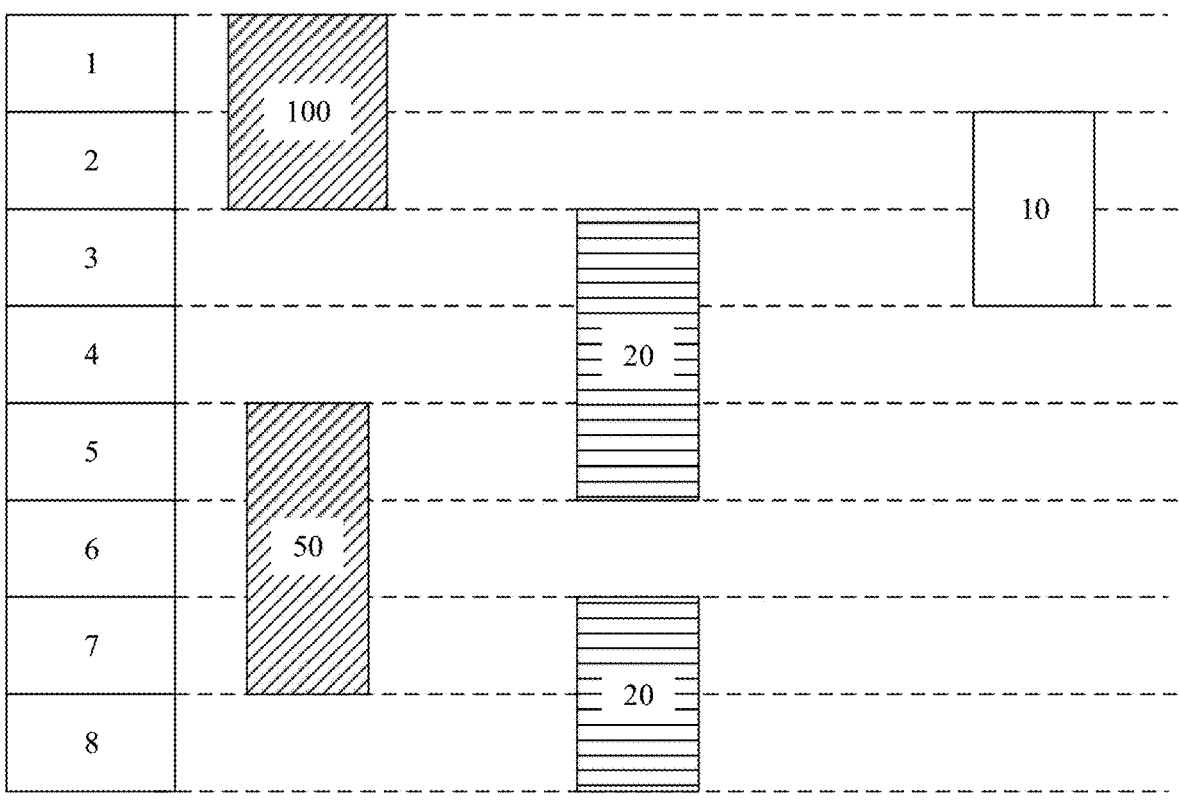

It may be learned that there is an intersection between the node set (2, 3) of the 10 MB memory block and either of the node set of the 100 MB memory block in the allocated set and the node set of the 20 MB memory block in the allocated set. Therefore, the 10 MB memory block is allocated for operations for the node 2 and a node 3. In addition, information about the 10 MB memory block is added to the allocated set, and an allocated set finally formed is shown in FIG. 6.

It can be learned from the foregoing analysis that by using the method in this embodiment of this application, memory of 130 MB=100 MB+20 MB+10 MB in total needs to be occupied during running of the neural network shown in FIG. 1. By contrast, when memory is optimized based on a sequence of occupying memory blocks by the neural network, memory of 150 MB needs to be occupied by the neural network shown in FIG. 1. It can be learned that by using the manner in this application, memory occupation of the entire neural network can be reduced.

In an embodiment of this application, when a deep learning algorithm is used to establish a neural network, the memory allocation method for the neural network shown in FIG. 2 may be performed in the following manner.

Figure 7:
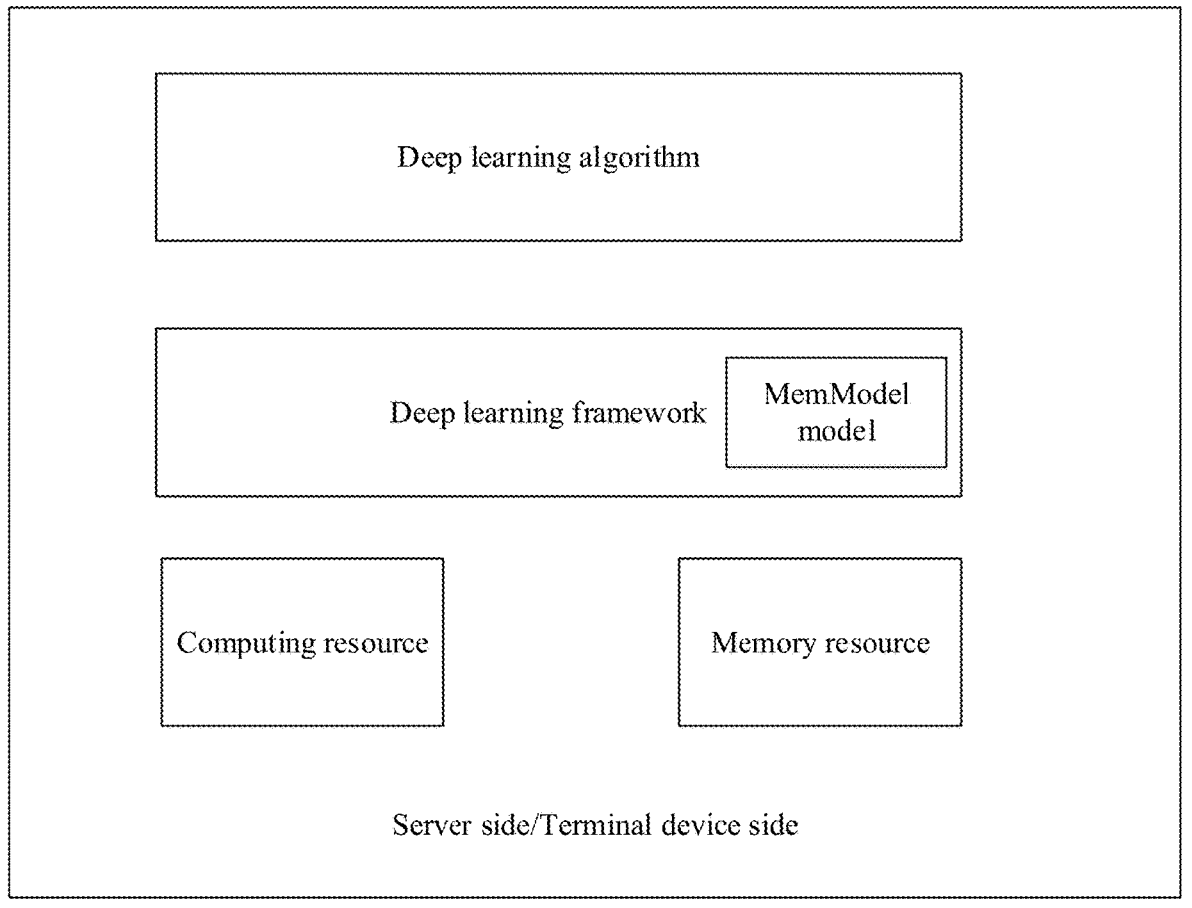
FIG. 7 is a schematic structural diagram of a server side or a terminal device side according to an embodiment of this application.

As shown in FIG. 7, a deep learning algorithm, a deep learning framework, a computing resource, a memory resource, and the like may be included on a server side or a terminal device side. The deep learning algorithm may invoke the computing resource and the memory resource through the deep learning framework.

In this embodiment of this application, a memory model (MemModel) module may be added to the deep learning framework. The MemModel module has two main functions. (1) In a pre-analysis phase, when a memory operation (a memory request and memory use) is performed through the deep learning framework, memory usage information is obtained, and information, such as a size of memory used during network running, is recorded. (2) In an actual use phase of a product, memory usage information is loaded, and memory is optimized through the MemModel module.

In this embodiment of this application, a MemModel class structure may be used to implement a specific function of the MemModel module. The information, such as the size of the memory used in the network running phase, may be recorded in the MemModel class structure.

In this embodiment of this application, the memory allocation method of the neural network shown in FIG. 2 may be implemented through program code. The program code may be included in software such as a machine learning platform or a deep learning platform, and is deployed on hardware of a server or terminal device.

In this embodiment of this application, by using an architecture shown in FIG. 7, the memory allocation method for the neural network shown in FIG. 2 may include a memory collection phase and a memory allocation phase.

(1) Memory collection phase. In an experiment phase, memory usage of the neural network is pre-analyzed, and memory information is collected. Finally, based on the collected memory information, a memory model is generated, and the memory model is exported.

Figure 8:
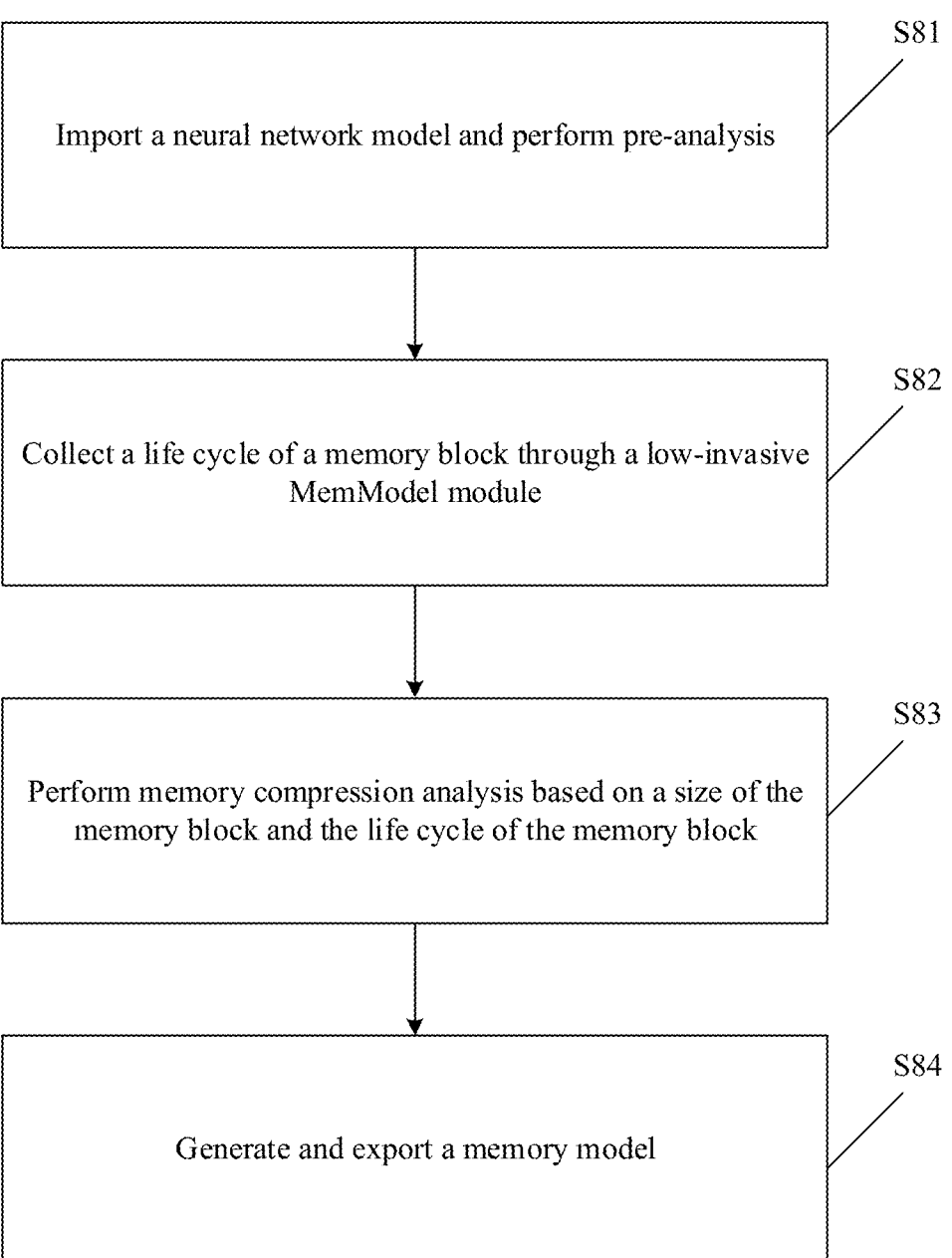
FIG. 8 is a flowchart of a pre-analysis according to an embodiment of this application.

Refer to FIG. 8 for a process of the memory collection phase.

Step S81. Import a neural network model and perform pre-analysis.

Step S82. Collect a life cycle of a memory block through a low-invasive MemModel module.

Step S83. Perform memory compression analysis based on a size of the memory block and the life cycle of the memory block.

Step S84. Generate and export a memory model.

In this embodiment of this application, the memory model may include information such as an identifier (ID) of a memory block, a size of the memory block, and a life cycle of the memory block.

Figure 9:
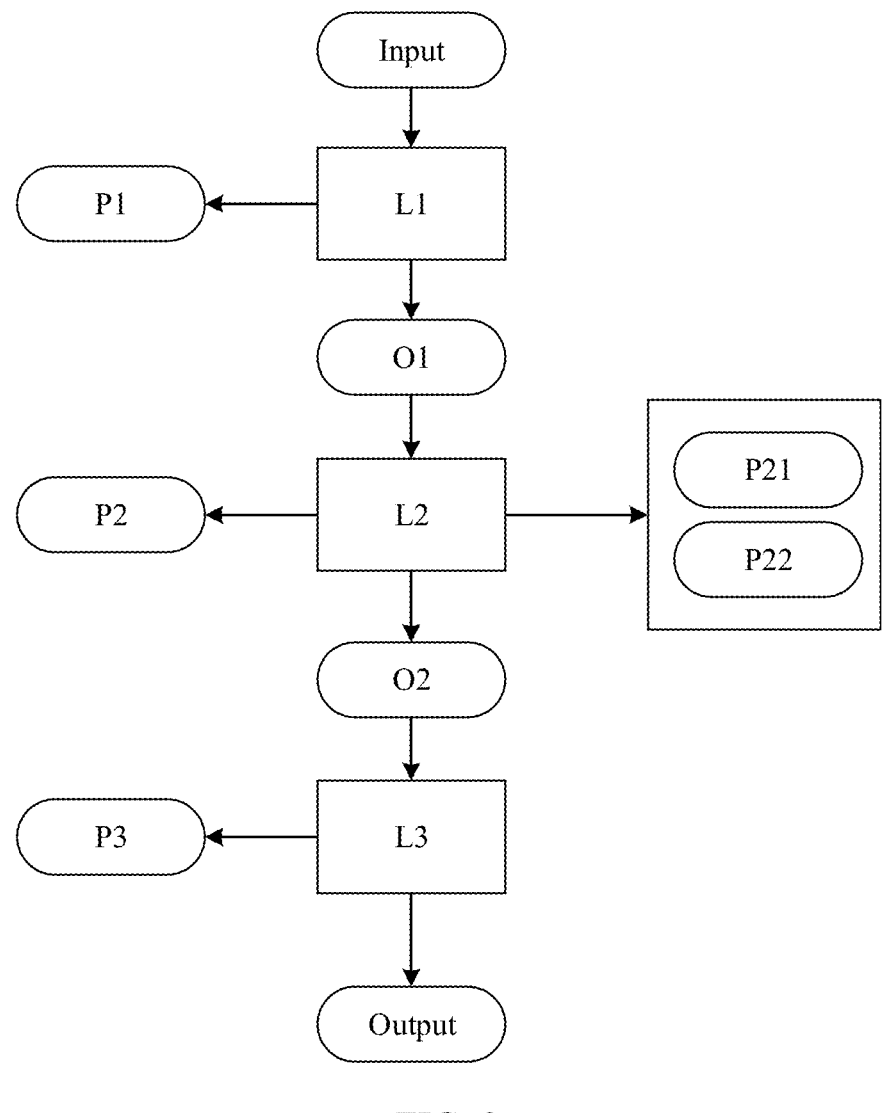
FIG. 9 is a schematic diagram of a neural network according to an embodiment of this application.

For example, as shown in FIG. 9, an entire neural network includes three nodes a node L1, a node L2, and a node L3. An input parameter of the node L1 is input, an output parameter of the node L1 is O1, and an intermediate parameter of the node L1 is P1. An input parameter of the node L2 is O1, an output parameter of the node L2 is O2, and intermediate parameters of the node L2 are P2, P21, and P22. An input parameter of the node L3 is O2, an output parameter of the node L3 is output, and an intermediate parameter of the node L3 is P3.

In this embodiment of this application, in the foregoing pre-analysis phase, the node L1 may be first executed. In a process of executing the node L1, information about memory blocks occupied by the input parameter input, the intermediate parameter P1, and the output parameter O1 is recorded. In addition, life cycles of the memory blocks occupied by the node L1 are set. For example, in the process of executing the node L1, the input parameter input occupies a memory block A, the intermediate parameter P1 occupies a memory block B, and the output parameter O1 occupies a memory block C. In this case, a life cycle of the memory block A may be set to (L1), a life cycle of the memory block B may be set to (L1), and a life cycle of the memory block C may be set to (L1). Then, the node L2 is executed. In a process of executing the node L2, information about memory blocks occupied by the input parameter O1, the output parameter O2, and the intermediate parameters P2, P21, and P22 is recorded. In addition, life cycles of the memory blocks occupied by the node L2 are set. For example, in the process of executing the node L2, if the input parameter O2 occupies the memory block C, the life cycle of the memory block C may be set to (L1, L2). If the intermediate parameters P2, P21, and P22 occupy the memory block B, the life cycle of the memory block B may be set to (L1, L2). If the output parameter O2 occupies a memory block D, a life cycle of the memory block D may be set to (L2). Then, the node L3 is executed. In a process of executing the node L3, information about memory blocks occupied by the input parameter O2, the intermediate parameter P3, and the output parameter output is recorded. In addition, life cycles of the memory blocks occupied by the node L3 are set. For example, in the process of executing the node L3, if the input parameter O2 occupies the memory block D, the life cycle of the memory block D may be set to (L1, L2). If the intermediate parameter P3 occupies a memory block E, a life cycle of the memory block E may be set to (L3). If the output parameter output occupies a memory block F, a life cycle of the memory block F may be set to (L3). Finally, based on obtained information about all memory blocks, the memory model is generated and exported. Still in the example shown in FIG. 9, the memory model finally generated may include the following information identification information of the memory block A, size information of the memory block A, the life cycle (L1) of the memory block A, identification information of the memory block B, size information of the memory block B, and the life cycle (L1, L2) of the memory block B, identification information of the memory block C, size information of the memory block C, and the life cycle (L1, L2) of the memory block C, identification information of the memory block D, size information of the memory block D, and the life cycle (L1, L2) of the memory block D, identification information of the memory block E, size information of the memory block E, and the life cycle (L3) of the memory block E, and identification information of the memory block F, size information of the memory block F, and the life cycle (L3) of the memory block F.

(2) Memory allocation phase. In this embodiment of this application, optimization may be performed based on a global memory optimization solution in an execution process of the memory model. After the information about all memory blocks are obtained, global coordination and allocation are performed based on sizes and life cycles of the memory blocks, and an optimization effect is close to a theoretical compression ratio.

Figure 10:
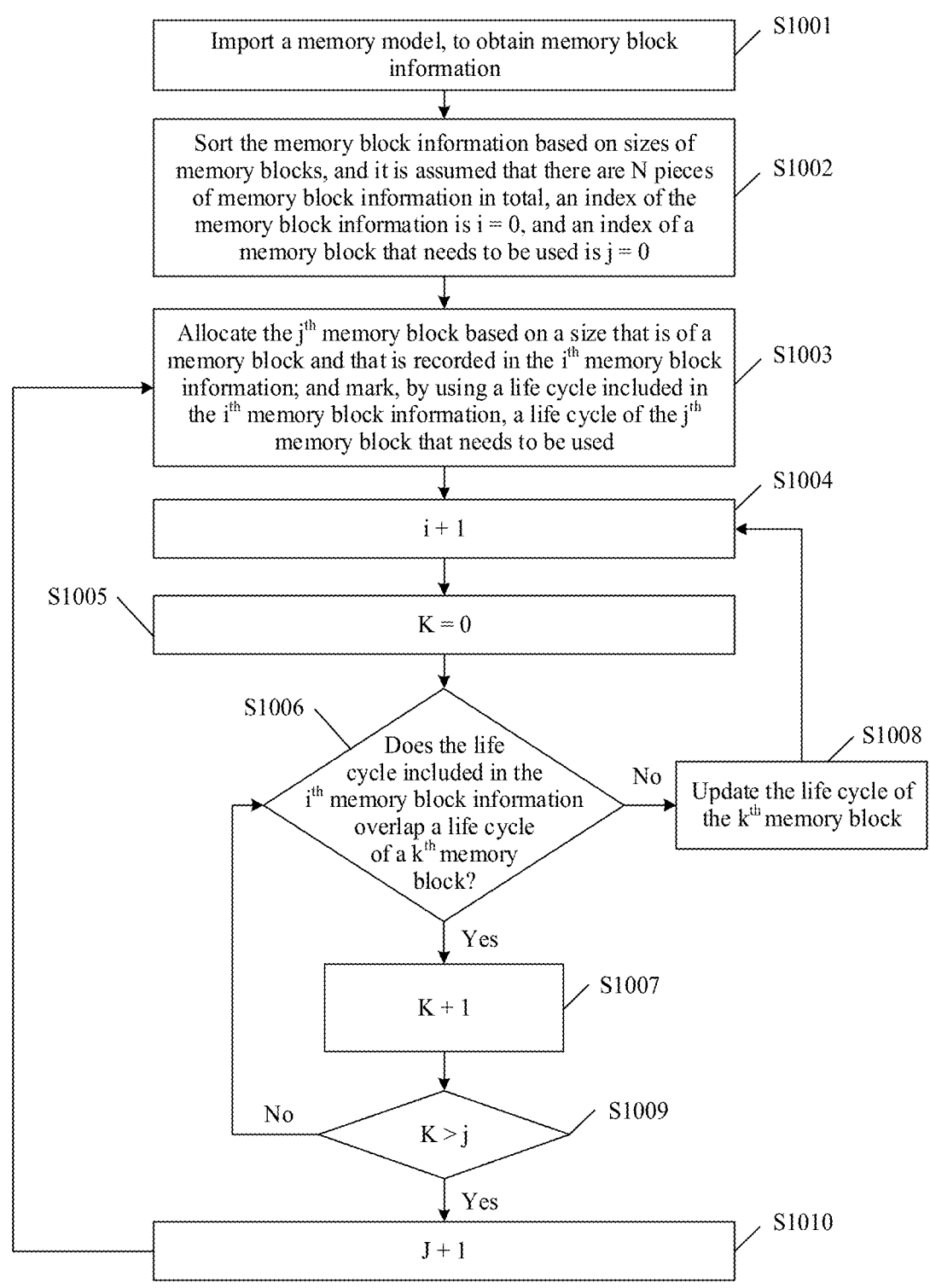
FIG. 10 is a flowchart of a memory allocation method for a neural network according to an embodiment of this application.

In this embodiment of this application, as shown in FIG. 10, an execution process of the memory allocation phase may be as follows.

Step S1001. Import a memory model to a terminal device, to obtain memory block information.

Step S1002. Sort the memory block information based on sizes of memory blocks, and it is assumed that there are N pieces of memory block information in total, an index of the memory block information is $i=0$, and an index of a memory block that needs to be used is $j=0$.

Step S1003. Allocate the $j^{th}$ memory block based on a size that is of a memory block and that is recorded in the $i^{th}$ memory block information, and mark, by using a life cycle included in the $i^{th}$ memory block information, a life cycle of the $j^{th}$ memory block that needs to be used.

Steps S1004 to S1006. Traverse all requested memory blocks in a first queue, and determine whether the life cycle of the $j^{th}$ memory block overlaps a life cycle of the requested memory block in the first queue. If the life cycle of the $j^{th}$ memory block overlaps each of life cycles of all the requested memory blocks, steps S1007, S1009, and S1010 are sequentially performed, and a memory block that needs to be used is newly requested. In addition, the life cycle included in the $i^{th}$ memory block information is used to mark the life cycle of the $j^{th}$ memory block. If the life cycle of the $j^{th}$ memory block does not overlap a life cycle of a requested kth memory block, step S1008 is performed, and the requested kth memory block is reused. In addition, the life cycle included in the $i^{th}$ memory block information is used to update the life cycle of the kth memory block. i, j, and k are integers greater than 1 but less than N.

In an example of this application, a total of three memory blocks need to be occupied during running of the entire neural network. The three memory blocks are a 100 MB memory block, an 80 MB memory block, and a 50 MB memory block. In addition, it is specified that the 100 MB memory block is used by nodes 3 to 6, the 80 MB memory block is used by nodes 5 to 8, and the 50 MB memory block is used by nodes 1 and 2. In this case, it may be identified that a life cycle of the 100 MB memory block is (3, 4, 5, 6), a life cycle of the 80 MB memory block is (5, 6, 7, 8), and a life cycle of the 50 MB memory block is (1, 2). First, a 100 MB memory may be actually allocated for the 100 MB memory block. Then, because the life cycle of the 80 MB memory block overlaps the life cycle of the 100 MB memory block, the 100 MB memory block cannot be reused for the 80 MB memory block. Therefore, memory is reallocated for the 80 MB memory block. In addition, the life cycle of the 50 MB memory block does not overlap the life cycle of the 100 MB memory block. Therefore, it is scheduled that the 100 MB memory block is reused for the 50 MB memory block.

In this embodiment of this application, global coordination and allocation are performed based on sizes and life cycle of the memory blocks, and an optimization effect is close to a theoretical compression ratio.

Figure 11:
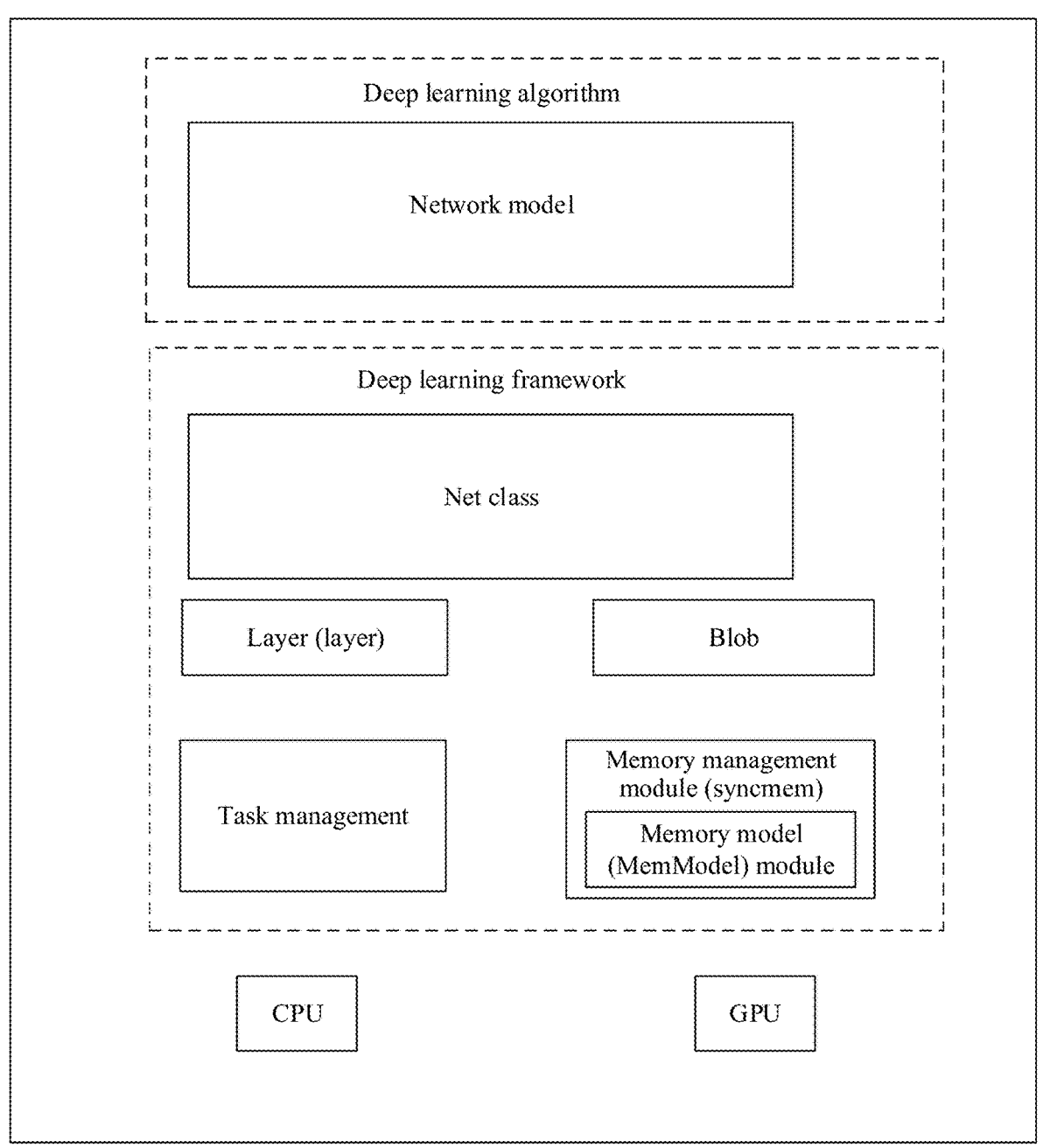
FIG. 11 is an architectural diagram of a network according to an embodiment of this application.

In an embodiment of this application, when the network architecture shown in FIG. 7 is applied to an open-source convolutional architecture for fast feature embedding (CAFFE) deep learning platform, as shown in FIG. 11, a deep learning algorithm may include a network model. The deep learning framework may include a net class, a layer, a blob, task management, and a memory management module (syncmem). A MemModel module may be disposed in the memory management module, and can be used to optimize memory based on original logic of the blob and the memory management module.

Figures 15, 16:
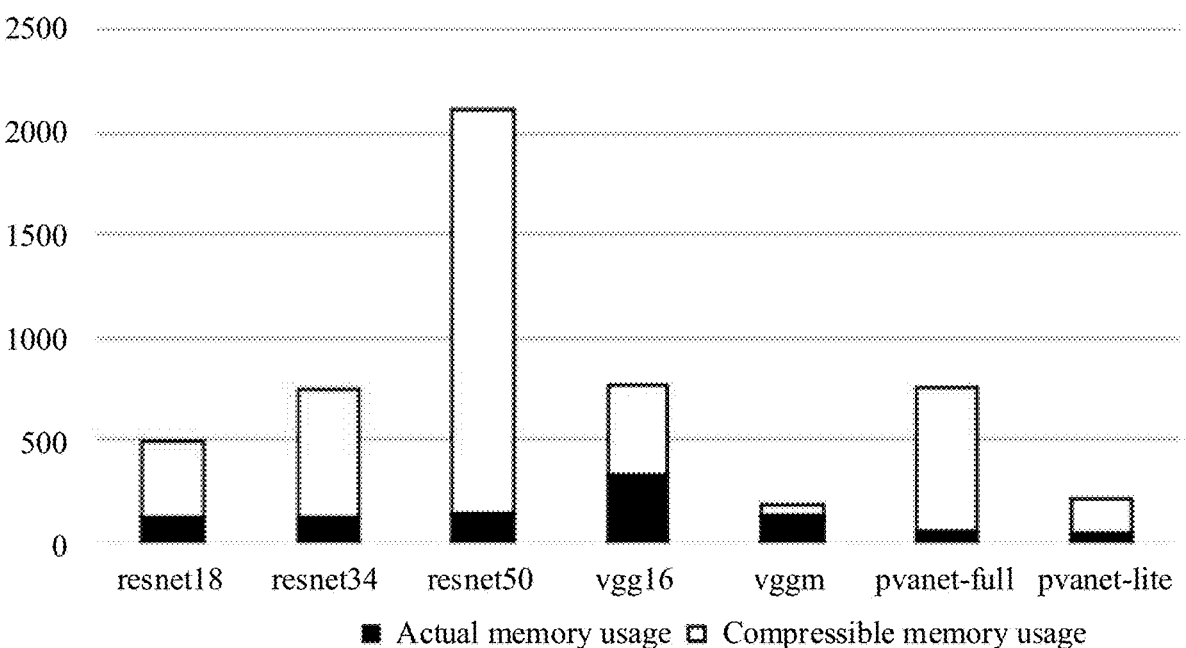
FIG. 15 is a schematic diagram of a memory optimization effect according to an embodiment of this application.
FIG. 16 is a schematic diagram of a directed acyclic graph (DAG) according to an embodiment of this application.

In this embodiment of this application, the network model may be a network model of a neural network. The net class may store a DAG graph corresponding to the neural network. For example, FIG. 16 shows an example of the DAG. In the example in FIG. 16, the neural network includes five nodes A, B, C, E, F, and G. An output parameter of the node A is used as an input parameter of the node B. An output parameter of the node B is used as an input parameter for both the node C and the node F. An output parameter of the node C is used as an input parameter of the node E. An output parameter of the node E and an output parameter of the node F are used as input parameters of the node G. The layer is used to store information about nodes included in the neural network, and the nodes may also be referred to as layers. The blob is used to store information about memory blocks occupied by an input parameter, an output parameter, and an intermediate parameter that correspond to each node during operation of the node in the neural network. The memory management module is configured to manage and allocate information about memory blocks occupied by the neural network.

In this embodiment of this application, a specific process of obtaining memory usage information may be as follows.

(1) The memory usage information is stored when memory is used by the neural network.

Figure 12:
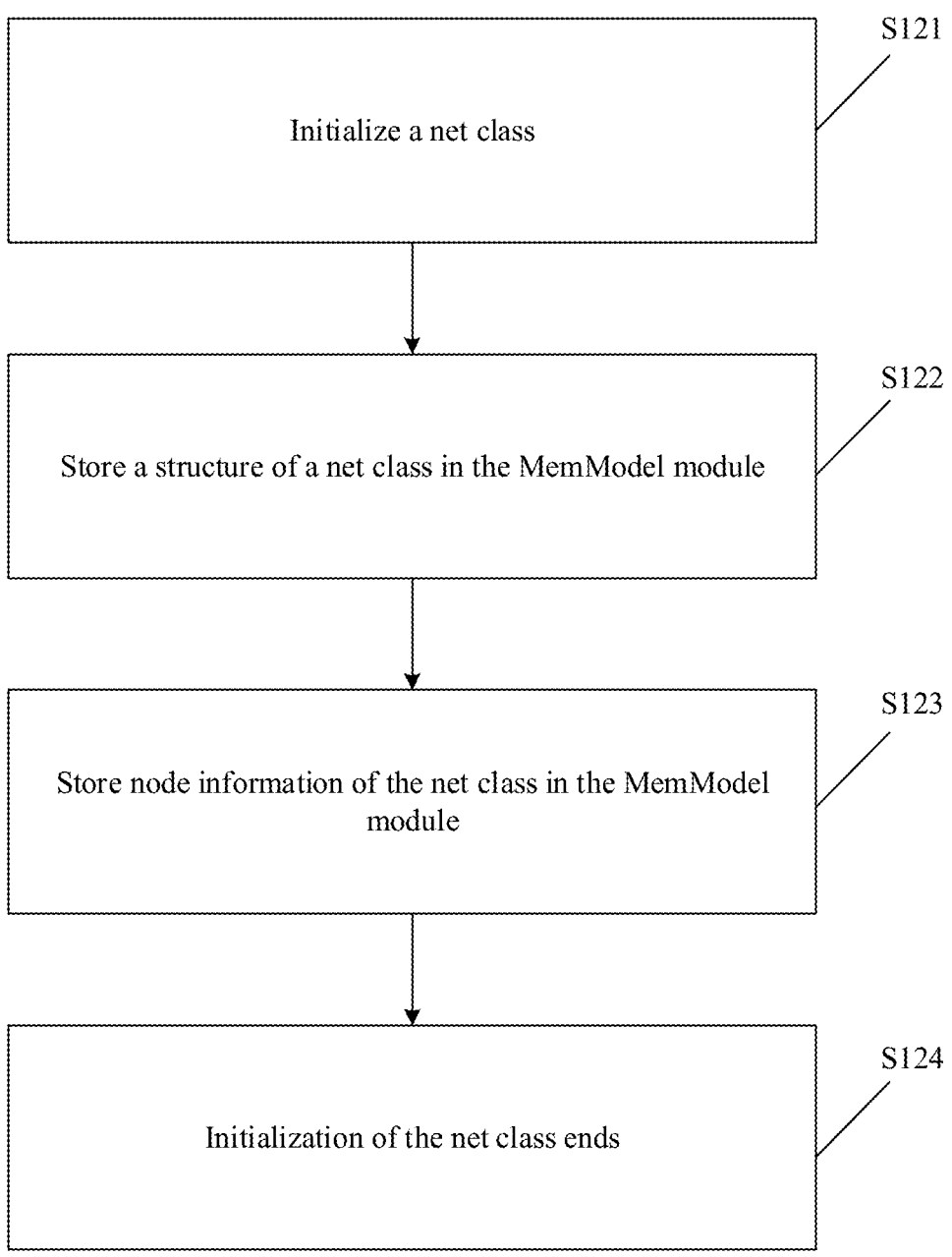
FIG. 12, FIG. 13, and FIG. 14 are flowcharts of memory allocation for a neural network according to an embodiment of this application.

In this embodiment of this application, the MemModel module may be initialized when a network (Net) class module of CAFFE is initialized. Refer to FIG. 12 for a specific process.

Step S121. Initialize the net class.

Step S122. Store a structure of a net class in the Mem-Model module.

Step S123. Store node information of the net layer in the MemModel module.

Step S124. Initialization of the net class ends.

(2) Memory information is recorded when memory is used by the layer of the neural network.

Figure 13:
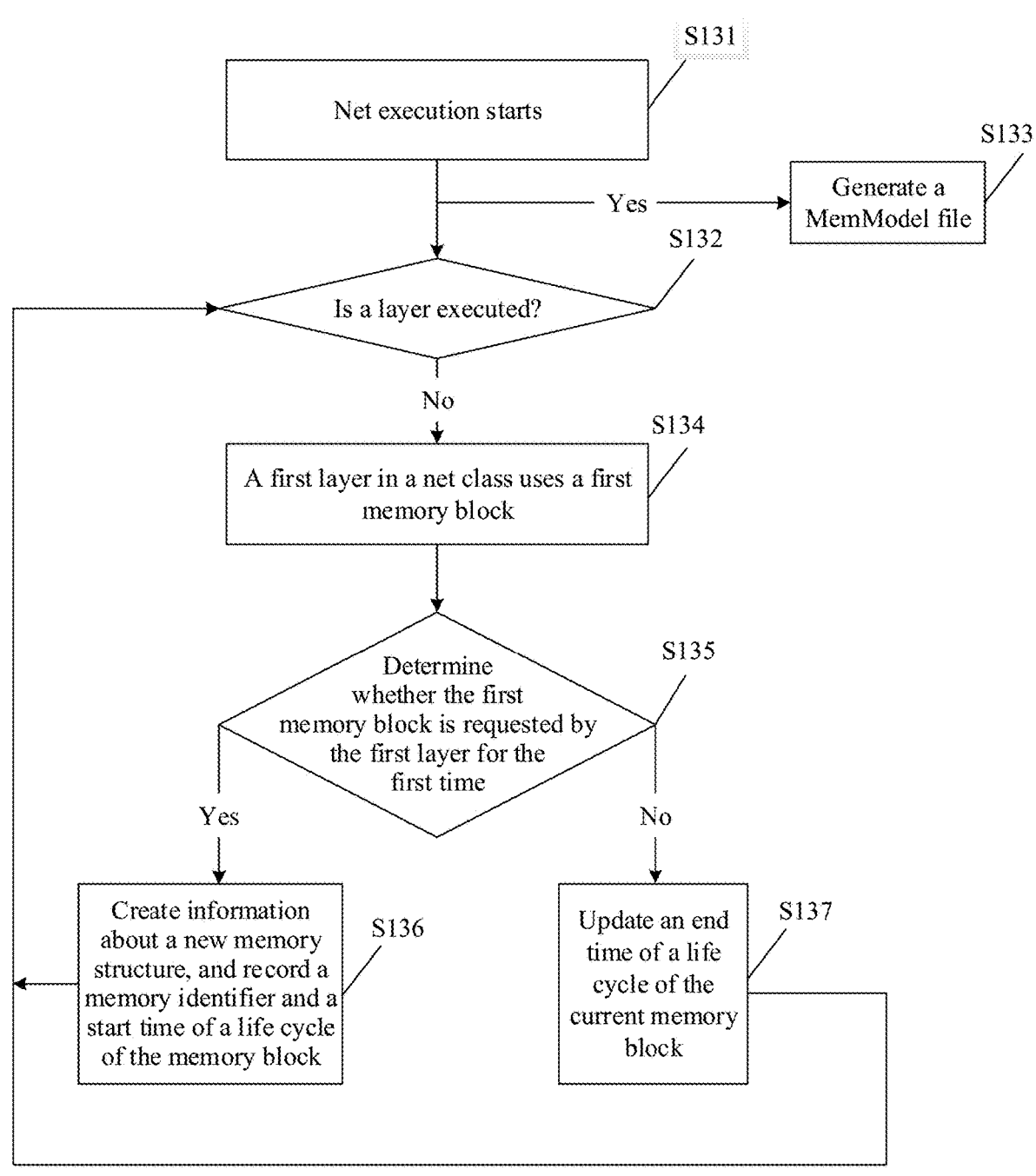

In this embodiment of this application, the memory usage information may be recorded in a layer module of the CAFFE. Refer to FIG. 13 for a specific process.

Step S131. Net execution starts.

Step S132. Determine whether the layer is executed, and perform step S133 if the layer is executed, or perform step S134 if the layer is not executed.

Step S133. Generate a MemModel file.

In this embodiment of this application, the MemModel file may include information such as an ID of a memory block, a size of the memory block, and a life cycle of the memory block. The MemModel file may be the same as information included in the memory model shown in FIG. 8.

Step S134. A first layer in a net layer uses a first memory block.

Step S135. Determine whether the first memory block is requested by the first layer for the first time, and perform step S136 if the first memory block is requested by the first layer for the first time, or perform step S137 if the first memory block is not requested by the first layer for the first time.

Step S136. Create information about a new memory structure, and record a memory identifier and a start time of a life cycle of the new memory structure.

Step S137. Update an end time of a life cycle of the current memory block.

(3) When a system is running, the MemModel model is loaded to optimize memory.

Figure 14:
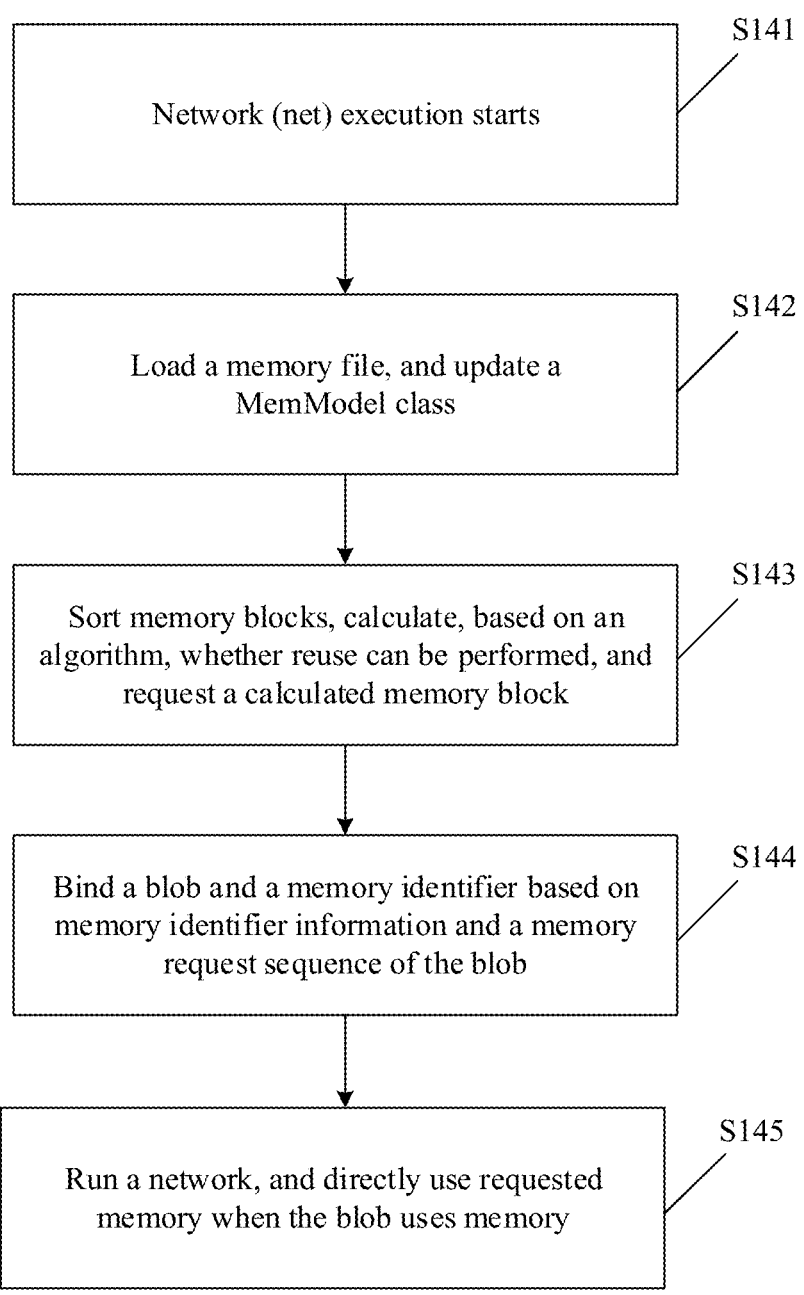

In this embodiment of this application, when the net module of the CAFFE performs a forward calculation, a memory file may be loaded, file information is updated to a MemModel class, and memory is optimized based on information in the MemModel class. Refer to FIG. 14 for a specific process in this embodiment of this application.

Step S141. Network (net) execution starts.

Step S142. Load the memory file, and update the Mem-Model class.

Step S143. Sort memory blocks, calculate, based on an algorithm, whether reuse can be performed, and request a calculated memory block.

In this embodiment of this application, for specific implementations of memory block sorting and reuse, refer to the method described in FIG. 10 or FIG. 2. Details are not described herein again.

Step S144. Bind the blob and a memory identifier based on memory identifier information and a memory request sequence of the blob.

In this embodiment of this application, it can be learned from the foregoing description that in the network architecture shown in FIG. 11, the blob stores information about memory blocks occupied by different parameters of a node. For example, the entire neural network includes three nodes a node 1, a node 2, and a node 3. In a pre-analysis phase, the node 1 occupies a memory block A, the node 2 occupies a memory block B, and the node 3 occupies a memory block C. In this case, a correspondence between the node 1 and the memory block A, a correspondence between the node 2 and the memory block B, and a correspondence between the node 3 and the memory block C may be stored in the blob. Through sorting and memory reuse in step S143, it may be scheduled that the memory block A is reused by both the memory block B corresponding to the node 2 and the memory block C corresponding to the node 3. In this case, the correspondence between the node 1 and the memory block A, a correspondence between the node 2 and the memory block A, and a correspondence between the node 3 and the memory block A may be bound and stored in the blob.

Step S145. Run the neural network, and directly use bound memory when the blob uses memory.

In the manner of this application, graphics processing unit (GPU) memory usage of a framework such as the CAFFE can be effectively reduced. For example, a more complex neural network can be run in a case of unchanged hardware resources, and a batch size (batchsize) during running can be increased in a case of same hardware and a same network. For example, for a deep learning network 50-layer residual neural network (resnet50), only 150 MB GPU memory is required by using the solution in the embodiments of this application. However, in other approaches, more than 2 gigabyte (GB) GPU memory needs to be used. For details, refer to FIG. 15.

Figure 17:
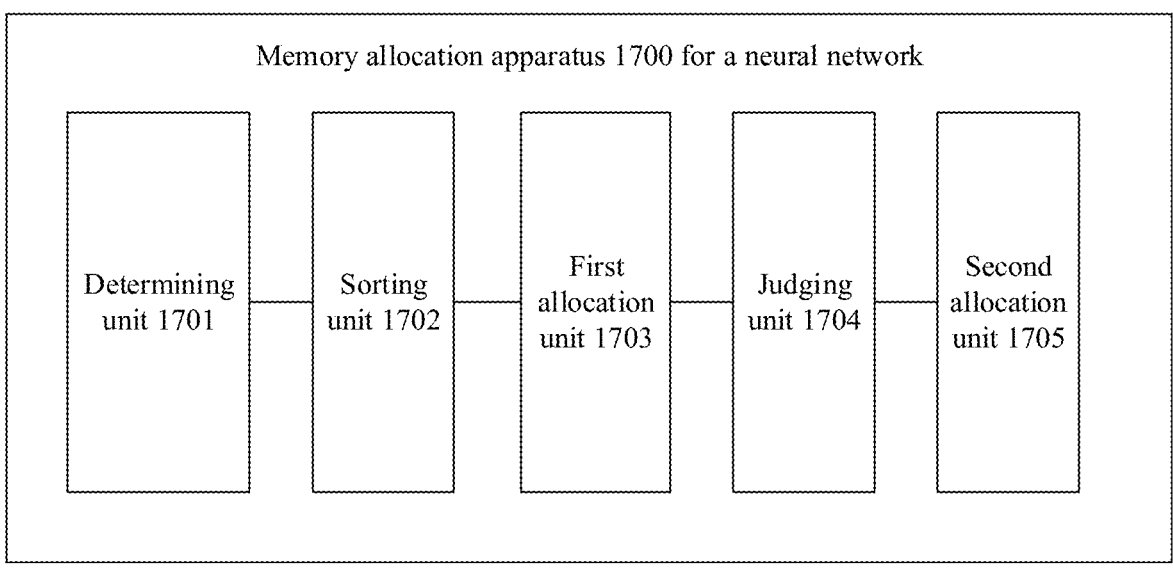
FIG. 17 and FIG. 18 are schematic structural diagrams of memory allocation apparatuses for a neural network according to an embodiment of this application.

Same as the foregoing concept, as shown in FIG. 17, a memory allocation apparatus 1700 for a neural network is provided in this application. It is specified that N memory blocks need to be occupied during running of the neural network, N is an integer greater than or equal to 1. The apparatus includes a determining unit 1701, a sorting unit 1702, a first allocation unit 1703, a judging unit 1704, and a second allocation unit 1705.

The determining unit 1701 is configured to determine information about the N memory blocks, where the information about the N memory blocks includes sizes of the N memory blocks and a node set that is in a one-to-one correspondence with each of the N memory blocks, and the memory block is used to perform an operation for the node set that is in the neural network and in a one-to-one correspondence with each memory block.

The sorting unit 1702 is configured to sort the N memory blocks in descending order based on the sizes of the N memory blocks, to obtain a sort sequence of the N memory blocks.

The first allocation unit 1703 is configured to allocate a first memory block to the neural network, to perform an operation for a first node set in the neural network, where the first memory block is a largest memory block in the N memory blocks.

The judging unit 1704 is configured to determine whether a memory block in an allocated set can be reused for an $n^{th}$ memory block, where the allocated set includes a memory block that has been allocated to the neural network.

The second allocation unit 1705 is configured to, when the memory block in the allocated set can be reused for the $n^{th}$ memory block, allocate, to the neural network, the memory block that can be reused, to perform an operation for an $n^{th}$ node set in the neural network, and update the allocated set, where n is a positive integer greater than or equal to 2 and less than or equal to N, and sequentially perform the foregoing determining from n=2 to n=N based on the sort sequence, and update the allocated set if it is determined that the memory block in the allocated set can be reused for the $n^{th}$ memory block.

Optionally, the memory allocation apparatus 1700 for the neural network may further include a third allocation unit 1706, configured to, when the memory block in the allocated set cannot be reused for the $n^{th}$ memory block, allocate the $n^{th}$ memory block to the neural network, to perform the operation for the $n^{th}$ node set in the neural network.

In an example of this application, the judging unit 1704 is further configured to determine whether there is an intersection between the $n^{th}$ node set and an $x^{th}$ node set, and if there is no intersection, determine that an $x^{th}$ memory block corresponding to the $x^{th}$ node set can be reused for the $n^{th}$ memory block, where the allocated set includes the $x^{th}$ memory block, the $x^{th}$ memory block is used to perform an operation for the $x^{th}$ node set in the neural network, and x is a positive integer less than n.

In an example of this application, when updating the allocated set, the second allocation unit 1705 is configured to update, based on the $n^{th}$ node set, a node set corresponding to the memory block that can be reused.

In an example of this application, the determining unit 1701 may be configured to run the neural network, record information about a memory block occupied by an input parameter of each node in the neural network, information about a memory block occupied by an output parameter of each node, and information about a memory block occupied by an intermediate parameter of each node, and determine the information about the N memory blocks based on the information about the memory block occupied by the input parameter of each node in the neural network, the information about the memory block occupied by the output parameter of each node, and the information about the memory block occupied by the intermediate parameter of each node.

In this embodiment of this application, for a specific implementation process of the memory allocation apparatus 1700 for the neural network, refer to descriptions of the method embodiments in FIG. 2 to FIG. 16. Details are not described herein again.

Figure 18:
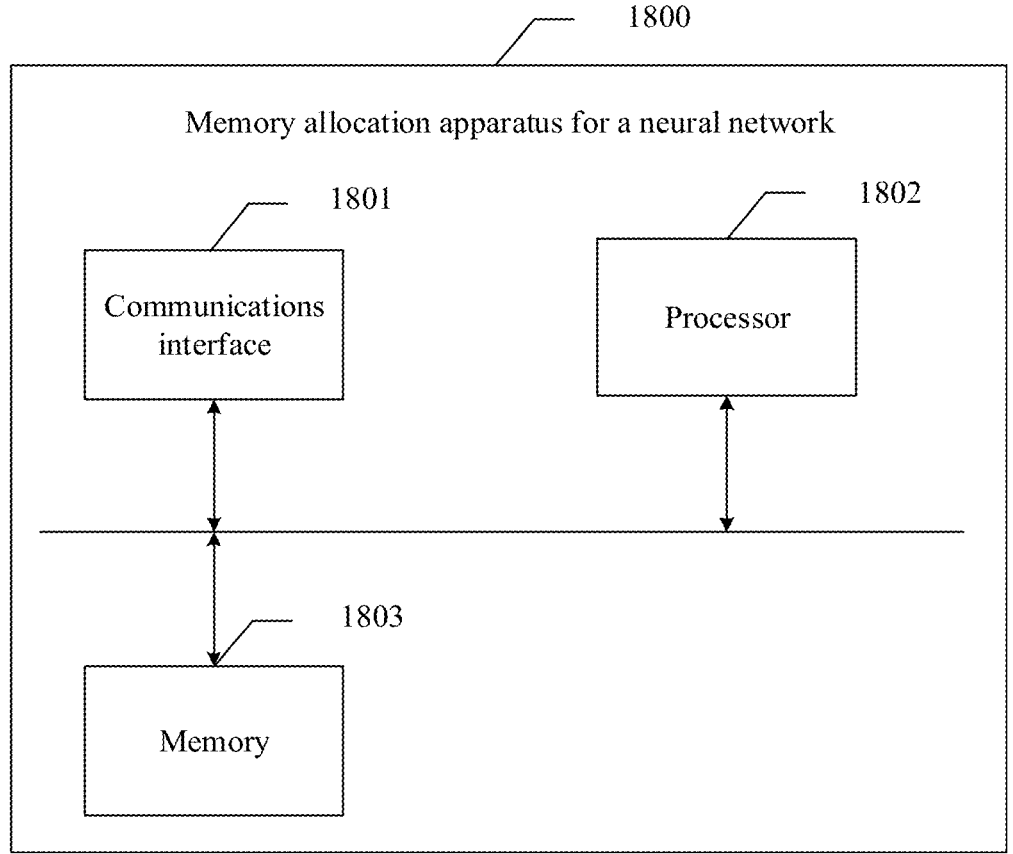

Same as the foregoing concept, as shown in FIG. 18, an embodiment of this application further provides a structure of a memory allocation apparatus 1800 for a neural network. The memory allocation apparatus 1800 for the neural network may be a terminal device or a server.

Optionally, the memory allocation apparatus 1800 for the neural network may be a central control module in the server, or a function of the memory allocation apparatus 1800 is implemented by a central control module in the server. Further optionally, the memory allocation apparatus 1800 for the neural network may be a central control module in the terminal device, or a function of the memory allocation apparatus 1800 is implemented by a central control module in the terminal device. As shown in FIG. 18, the memory allocation apparatus 1800 for the neural network may include a communications interface 1801 and a processor 1802. The memory allocation apparatus 1800 for the neural network may further include a memory 1803. The memory 1803 may be disposed inside the memory allocation apparatus 1800 for the neural network, or may be disposed outside the memory allocation apparatus 1800 for the neural network. Functions of the determining unit 1701, the sorting unit 1702, the first allocation unit 1703, the judging unit 1704, and the second allocation unit shown in FIG. 17 may be implemented by the processor 1802.

In this embodiment of this application, the processor 1802 may be a general purpose processor, a digital signal processor, an application-specific integrated circuit, a field programmable gate array or another programmable logic device, a discrete gate or transistor logic device, or a discrete hardware component, and may implement or execute the memory allocation method for the neural network, shown in FIG. 2 to FIG. 16 and disclosed in the embodiments of this application. The general purpose processor may be a microprocessor, any conventional processor, or the like. The steps of the method disclosed with reference to the embodiments of this application may be directly performed by a hardware processor, or may be performed by using a combination of hardware in the processor and a software unit. Program code executed by the processor 1802 to implement the foregoing method may be stored in the memory 1803. The memory 1803 is coupled to the processor 1802. The processor 1802 may operate with the memory 1803. The memory 1803 may be a nonvolatile memory, such as a hard disk drive (HDD) or a solid-state drive (SSD), or may be a volatile memory such as a random-access memory (RAM). The memory 1803 is any other medium that can be configured to carry or store expected program code that is in a form of an instruction or a data structure and that can be accessed by a computer, but is not limited thereto.

In this embodiment of this application, a specific connection medium between the communications interface 1801, the processor 1802, and the memory 1803 is not limited. In this embodiment of this application, in FIG. 18, the memory 1803, the processor 1802, and the communications interface 1801 are connected through a bus. The bus is represented by a bold line in FIG. 18. A connection manner between other components is merely an example for description, and is not limited thereto. The bus may be classified into an address bus, a data bus, a control bus, and the like. For ease of representation, only one bold line is used to represent the bus in FIG. 18, but this does not mean that there is only one bus or only one type of bus.

Based on the foregoing embodiments, an embodiment of this application further provides a computer storage medium. The storage medium stores a software program, and when read and executed by one or more processors, the software program may perform the method provided in any one or more of the foregoing embodiments. The computer storage medium may include any medium that can store program code, such as a Universal Serial Bus (USB) flash drive, a removable hard disk, a read-only memory (ROM), a RAM, a magnetic disk, or an optical disc.

Based on the foregoing embodiments, this application provides a computer program, where the computer program includes a computer instruction, and when the computer instruction is executed by a processor, the processor is enabled to perform the method provided in any one or more of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc-read only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the claims of this application and equivalent technologies thereof.

The invention claimed is:

1. A memory allocation method, comprising:
   obtaining first information about N memory blocks, wherein the first information comprises a plurality of life cycles of the N memory blocks and a plurality of node sets in a one-to-one correspondence with the N memory blocks, and wherein the life cycles are for the node sets to perform a first operation in a neural network;
   sorting the N memory blocks in descending order based on the life cycles;
   allocating, after the sorting, a first memory block of the N memory blocks to the neural network to perform a second operation for a first node set in the neural network;
   determining whether a second memory block of the N memory blocks in an allocated set is reusable as an $n^{th}$ memory block of the N memory blocks, wherein n is a positive integer greater than or equal to 2 and less than or equal to N; and
   allocating the second memory block to the neural network to perform a third operation for an $n^{th}$ node set in the neural network and update the allocated set when the second memory block is reusable as the $n^{th}$ memory block.

2. The memory allocation method of claim 1, wherein the first memory block is a largest of the N memory blocks.

3. The memory allocation method of claim 1, further comprising allocating the $n^{th}$ memory block to the neural network to perform the third operation when the second memory block is not reusable for the $n^{th}$ memory block.

4. The memory allocation method of claim 1, wherein N is an integer greater than or equal to 1.

5. The memory allocation method of claim 1, wherein the allocated set comprises an $x^{th}$ memory block of the N memory blocks.

6. The memory allocation method of claim 1, further comprising updating a second node set corresponding to the second memory block based on the $n^{th}$ node set.

7. The memory allocation method of claim 1, further comprising:
   running the neural network;
   occupying a third memory block by an input parameter of each node in the neural network to record second information about the third memory block;
   occupying a fourth memory block by an output parameter of each node to record third information about the fourth memory block;
   occupying a fifth memory block by an intermediate parameter of each node to record fourth information about the fifth memory block; and
   determining the first information based on the second information, the third information, and the fourth information.

8. A memory allocation apparatus, comprising:

a memory configured to store instructions; and one or more processors coupled to the memory and configured to execute the instructions to cause the memory allocation apparatus to:

obtain first information about N memory blocks, wherein N is an integer greater than or equal to 1, wherein the first information comprises a plurality of life cycles of the N memory blocks and a plurality of node sets in a one-to-one correspondence with the N memory blocks, and wherein the life cycles are for the node sets to perform a first operation in a neural network;

sort the N memory blocks in descending order based on the life cycles;

allocate, after the sorting, a first memory block of the N memory blocks to the neural network to perform a second operation for a first node set in the neural network;

determine whether a second memory block of the N memory blocks in an allocated set is reusable as an $n^{th}$ memory block of the N memory blocks, wherein n is a positive integer greater than or equal to 2 and less than or equal to N; and allocate the second memory block to the neural network to perform a third operation for an $n^{th}$ node set in the neural network and update the allocated set when the second memory block is reusable as the $n^{th}$ memory block.

9. The memory allocation apparatus of claim 8, wherein the first memory block is a largest of the N memory blocks.

10. The memory allocation apparatus of claim 8, wherein the one or more processors are configured to further cause the memory allocation apparatus to allocate the $n^{th}$ memory block to the neural network to perform the third operation when the second memory block is not reusable as the $n^{th}$ memory block.

11. The memory allocation apparatus of claim 8, wherein the allocated set comprises an $x^{th}$ memory block.

12. The memory allocation apparatus of claim 8, wherein the one or more processors are configured to further cause the memory allocation apparatus to update a second node set corresponding to the second memory block based on the $n^{th}$ node set.

13. The memory allocation apparatus of claim 8, wherein the one or more processors are configured to further cause the memory allocation apparatus to:

run the neural network;

occupy a third memory block by an input parameter of each node in the neural network to record second information about the third memory block;

occupy a fourth memory block by an output parameter of each node to record third information about the fourth memory block;

occupy a fifth memory block by an intermediate parameter of each node to record fourth information about the fifth memory block; and determine the first information based on the second information, the third information, and the fourth information.

14. A computer program product comprising computer-executable instructions that are stored on a non-transitory computer-readable storage medium and that, when executed by one or more processors, cause a memory allocation apparatus to:

obtain first information about N memory blocks, wherein the first information comprises a plurality of life cycles of the N memory blocks and a plurality of node sets in a one-to-one correspondence with one of the N memory blocks, and wherein the life cycles are for the node sets to perform a first operation in a neural network;

sort the N memory blocks in descending order based on the life cycles;

allocate, after the sorting, a first memory block to the neural network to perform a second operation for a first node set in the neural network;

determine whether a second memory block of the N memory blocks in an allocated set is reusable as an $n^{th}$ memory block of the N memory blocks, wherein n is a positive integer greater than or equal to 2 and less than or equal to N; and allocate the second memory block to the neural network to perform a third operation for an $n^{th}$ node set in the neural network and update the allocated set when the second memory block is reusable as the $n^{th}$ memory block.

15. The computer program product of claim 14, wherein the first memory block is a largest of the N memory blocks.

16. The computer program product of claim 14, wherein the computer-executable instructions, when executed by the one or more processors, further cause the memory allocation apparatus to allocate the $n^{th}$ memory block to the neural network to perform the third operation when the second memory block is not reusable as the $n^{th}$ memory block.

17. The computer program product of claim 14, wherein the allocated set comprises an $x^{th}$ memory block of the N memory blocks.

18. The computer program product of claim 14, wherein N is an integer greater than or equal to 1.

19. The computer program product of claim 14, wherein the computer-executable instructions, when executed by the one or more processors, further cause the memory allocation apparatus to update a second node set corresponding to the second memory block based on the $n^{th}$ node set.

20. The computer program product of claim 14, wherein the computer-executable instructions, when executed by the one or more processors, further cause the memory allocation apparatus to:

run the neural network;

occupy a third memory block by an input parameter of each node in the neural network to record second information about the third memory block;

occupy a fourth memory block by an output parameter of each node to record third information about the fourth memory block;

occupy a fifth memory block by an intermediate parameter of each node to record fourth information about the fifth memory block; and determine the first information based on the second information, the third information, and the fourth information.

\* \* \* \* \*